United States Patent
Kato

(10) Patent No.: US 11,163,866 B2
(45) Date of Patent: Nov. 2, 2021

(54) SHARED TERMINAL, DISPLAY CONTROL METHOD, AND NON-TRANSITORY COMPUTER-READABLE MEDIUM

(71) Applicant: Yoshinaga Kato, Kanagawa (JP)

(72) Inventor: Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 235 days.

(21) Appl. No.: 15/936,813

(22) Filed: Mar. 27, 2018

(65) Prior Publication Data

US 2018/0288186 A1    Oct. 4, 2018

(30) Foreign Application Priority Data

Mar. 31, 2017  (JP) .............................. JP2017-070970
Mar. 20, 2018  (JP) .............................. JP2018-052606

(51) Int. Cl.
*G06F 17/00*   (2019.01)
*G06F 21/34*   (2013.01)
(Continued)

(52) U.S. Cl.
CPC .......... *G06F 21/34* (2013.01); *H04L 12/1813* (2013.01); *H04L 63/0876* (2013.01);
(Continued)

(58) Field of Classification Search
CPC ...... G06F 21/6218; G06F 21/35; G06F 21/34; H04L 12/1813; H04L 63/102;
(Continued)

(56) References Cited

U.S. PATENT DOCUMENTS 6,038,295 A * 3/2000 Mattes ................ H04M 3/4938
                                                          348/211.3
6,256,028 B1 * 7/2001 Sanford ............. G06F 16/9574
                                                             715/841
(Continued)

FOREIGN PATENT DOCUMENTS

CN    103279256 A    9/2013
CN    105871960 A    8/2016
(Continued)

OTHER PUBLICATIONS

Extended European Search Report dated Jul. 11, 2018.
Chinese Office Action dated Jul. 2, 2019.

*Primary Examiner* — Stephen S Hong
*Assistant Examiner* — Matthew J Ludwig
(74) *Attorney, Agent, or Firm* — Harness, Dickey & Pierce, P.L.C.

(57) ABSTRACT

A shared terminal includes circuitry. The circuitry controls a display to display an image to a plurality of users. The circuitry obtains, from a first terminal of a first user, first terminal identification. The circuitry transmits an authentication request and the first terminal identification information to a terminal management server, the terminal management server storing, for each of the plurality of users, a user name of a user in association with terminal identification information identifying a terminal of the user. The circuitry receives a first user name of the first user, which is transmitted from the terminal management server based on a successful authentication result for the authentication request. The circuitry controls the display to display a graphical representation that reflects a private folder of the first user as one of selectable destinations in which electronic file data is to be stored.

14 Claims, 21 Drawing Sheets

(51) Int. Cl.
    *H04L 29/06*     (2006.01)
    *H04L 12/18*     (2006.01)
    *H04L 29/08*     (2006.01)
    *H04W 12/06*     (2021.01)
    *G06F 21/31*     (2013.01)

(52) U.S. Cl.
    CPC .......... *H04L 63/102* (2013.01); *H04L 65/403* (2013.01); *H04L 65/4015* (2013.01); *H04L 67/303* (2013.01); *G06F 21/31* (2013.01); *H04L 63/08* (2013.01); *H04W 12/06* (2013.01)

(58) Field of Classification Search
    CPC . H04L 65/4015; H04L 65/403; H04L 67/303; H04L 63/0876
    USPC .......................................... 715/255, 750, 733
    See application file for complete search history.

(56) References Cited

U.S. PATENT DOCUMENTS

| | | | | |
|---|---|---|---|---|
| 7,162,528 | B1* | 1/2007 | Simonoff | H04L 12/1822 709/229 |
| 7,813,934 | B1* | 10/2010 | Chung | G06K 17/00 716/100 |
| 10,452,338 | B2* | 10/2019 | Kato | G06F 3/1423 |
| 10,681,047 | B2* | 6/2020 | Katsuragi | G06F 21/6218 |
| 2004/0029087 | A1* | 2/2004 | White | G09B 19/22 434/219 |
| 2005/0238156 | A1* | 10/2005 | Turner | H04L 12/1818 379/202.01 |
| 2009/0299901 | A1* | 12/2009 | Garcia | G06Q 40/02 705/43 |
| 2010/0082681 | A1* | 4/2010 | Adimatyam | H04N 21/443 707/784 |
| 2010/0262673 | A1* | 10/2010 | Chang | G06F 3/1454 709/217 |
| 2013/0019182 | A1* | 1/2013 | Gil | G06F 3/0482 715/738 |
| 2013/0046833 | A1 | 2/2013 | Riepling et al. | |
| 2013/0047093 | A1* | 2/2013 | Reuschel | G06F 3/1423 715/753 |
| 2013/0162663 | A1 | 6/2013 | Mano et al. | |
| 2014/0055400 | A1* | 2/2014 | Reuschel | G06F 3/011 345/173 |
| 2014/0125580 | A1* | 5/2014 | Eun | G06F 3/017 345/156 |
| 2015/0149929 | A1* | 5/2015 | Shepherd | H04L 65/403 715/753 |
| 2015/0169069 | A1* | 6/2015 | Lo | G06F 3/011 715/753 |
| 2015/0331557 | A1 | 11/2015 | Fish et al. | |
| 2015/0331604 | A1 | 11/2015 | Tse et al. | |
| 2015/0332037 | A1 | 11/2015 | Tse et al. | |
| 2015/0334138 | A1 | 11/2015 | Conklin et al. | |
| 2015/0334139 | A1 | 11/2015 | Conklin et al. | |
| 2016/0165180 | A1 | 6/2016 | Kato et al. | |
| 2016/0294571 | A1 | 10/2016 | Kato et al. | |
| 2016/0295162 | A1 | 10/2016 | Kato | |
| 2016/0295354 | A1 | 10/2016 | Kato et al. | |
| 2016/0295626 | A1 | 10/2016 | Kato et al. | |
| 2016/0352787 | A1 | 12/2016 | Kato | |
| 2016/0366371 | A1 | 12/2016 | Kato et al. | |
| 2017/0011227 | A1* | 1/2017 | Tse | G06F 21/36 |
| 2017/0031590 | A1 | 2/2017 | Tsuchimoto | |
| 2017/0064533 | A1 | 3/2017 | Fujikami et al. | |
| 2017/0090843 | A1 | 3/2017 | Kato et al. | |
| 2017/0171511 | A1 | 6/2017 | Kato et al. | |
| 2017/0249764 | A1 | 8/2017 | Fujii et al. | |
| 2017/0287274 | A1* | 10/2017 | Takeda | G07F 17/3255 |

FOREIGN PATENT DOCUMENTS

| | | |
|---|---|---|
| CN | 106063306 A | 10/2016 |
| JP | 2001-292266 | 10/2001 |
| JP | 2013-115654 A | 6/2013 |

* cited by examiner

| TERMINAL ID | USER ID | USER |
|---|---|---|
| aaa | 10001 | Kato |
| bbb | 10002 | Jim |
| . . . | . . . | . . . |

FIG. 10B

| USER ID | FOLDER NAME |
|---|---|
| 10001 | Katofolder |
| 10002 | Jimfolder |
| . . . | . . . |

FIG. 12A

LOGIN SCREEN 170

● Start login process

Hold privately-owned terminal over

FIG. 12B

ERROR NOTIFICATION SCREEN 180

Hold another privately-owned terminal over

FIG. 12C

DRAWING START SCREEN 190

Welcome, Mr. KATO

SHARED TERMINAL, DISPLAY CONTROL METHOD, AND NON-TRANSITORY COMPUTER-READABLE MEDIUM

CROSS-REFERENCE TO RELATED APPLICATIONS

This patent application is based on and claims priority pursuant to 35 U.S.C. § 119(a) to Japanese Patent Application Nos. 2017-070970, filed on Mar. 31, 2017 and 2018-052606, filed on Mar. 20, 2018, the entire disclosures of which are hereby incorporated by reference herein.

BACKGROUND

Technical Field

The present disclosure relates to a shared terminal, a display control method, and a non-transitory computer-readable medium.

Description of the Related Art

Recently, electronic whiteboards that can be shared by a plurality of users are disposed in various types of places such as meeting rooms in companies or classrooms in educational institutions. The electronic whiteboard is provided with a touch panel display of large size, on which each user draws an image with a dedicated electronic pen or his or her finger. This enables the users to conduct a meeting or a lecture while viewing a same image drawn by each user.

A shared terminal such as the electronic whiteboard is able to transmit electronic file data such as data of the drawn-image to external file management servers. The external file management server stores the received electronic file data. The shared terminal is able to obtain the electronic file data stored in the file management server as needed.

SUMMARY

A shared terminal includes circuitry. The circuitry controls a display to display an image to a plurality of users, the plurality of users simultaneously sharing a use of the shared terminal. The circuitry obtains, from a first terminal of a first user, first terminal identification information for identifying the first terminal. The circuitry transmits an authentication request and the first terminal identification information to a terminal management server, the terminal management server storing, for each of the plurality of users, a user name of a user in association with terminal identification information identifying a terminal of the user. The circuitry receives a first user name of the first user, the first user name being transmitted from the terminal management server based on a successful authentication result for the authentication request, the successful authentication result being obtained based on a determination that the first terminal identification information is stored in the terminal management server. The circuitry controls the display to display a graphical representation that reflects a private folder of the first user as one of selectable destinations in which electronic file data is to be stored.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 10A is a conceptual diagram illustrating a terminal management table, according to an embodiment of the present disclosure;

FIG. 10B is a conceptual diagram illustrating a folder management table, according to an embodiment of the present disclosure;

FIGS. 12A, 12B and 12C each illustrates an example screen displayed by the display at the electronic whiteboard, according to an embodiment of the present disclosure;

Figure 1:
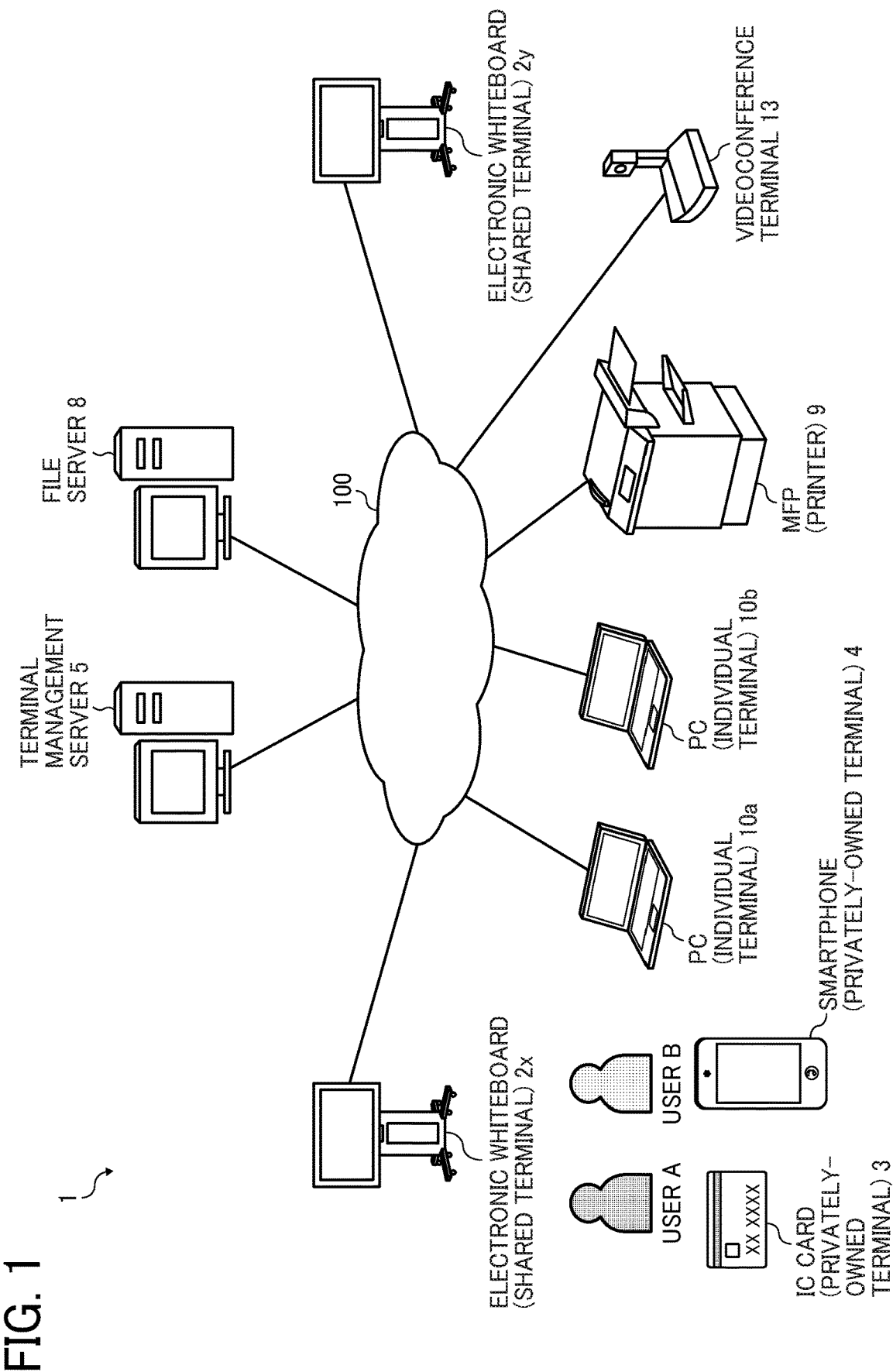
FIG. 1 is a schematic diagram illustrating a communication system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Referring to the drawings, a communication system 1 is described in detail according to an embodiment.

<Overview of System Configuration>

First, an overview of a configuration of the communication system 1 is described according to an embodiment. FIG. 1 is a schematic diagram illustrating a configuration of the communication system 1 according to the embodiment.

As illustrated in FIG. 1, the communication system 1 of the embodiment includes an electronic whiteboard 2x, an electronic whiteboard 2y, an integrated circuit (IC) card 3, a smartphone 4, a terminal management server 5, a file management server 8, a multifunction peripheral, product or printer (MFP) 9, personal computers (PCs) 10a and 10b, and a videoconference terminal 13. For simplicity, in the following, any arbitrary one of the electronic whiteboards 2x and 2y is referred to as the "electronic whiteboard 2". Any arbitrary one of the PCs 10a and 10b is referred to as the "PC 10".

The electronic whiteboard 2, the terminal management server 5, the file management server 8, the MFP 9, the PC 10, and the videoconference terminal 13 of the communication system 1 are communicable with one another through a communication network 100. The communication network 100 is implemented by the Internet, mobile communication network, local area network (LAN), etc. The communication network 100 may include, in addition to a wired network, a wireless network in compliance with such as 3rd Generation (3G), Worldwide Interoperability for Microwave Access (WiMAX), Long Term Evolution (LTE), etc. The electronic whiteboard 2, IC card 3, and smartphone 4 are communicable with one another using a near-distance communication technology in compliance with such as Near Field Communication (NFC) (Registered Trademark). The smartphone 4 may communicate with the electronic whiteboard 2 using the near-distance communication technology in compliance with such as Bluetooth (Registered Trademark).

One of the electronic whiteboard 2x and the electronic whiteboard 2y transmits or receives drawing image data representing a content drawn by a user ("drawing image data"), to or from the other one of the electronic whiteboard 2x and the electronic whiteboard 2y. That is, the content drawn at the electronic whiteboard 2x is displayed at the electronic whiteboard 2y, and the content drawn at the electronic whiteboard 2y is displayed at the electronic whiteboard 2x.

The electronic whiteboard 2 generates image data in Refined Printing Command Stream (RPCS) based on the drawing image data, and transmits the generated image data to the MFP 9 through the communication network 100. In another example, the electronic whiteboard 2 generates image data in Portable Document Format (PDF) based on the drawing image data, and transmits an electronic mail attached with the generated image data to the PC 10 through the communication network 100. The MFP 9 prints an image based on the drawing image data received from the electronic whiteboard 2. The PC 10 displays an image based on the drawing image data extracted from the electronic mail.

The electronic whiteboard 2 may display an image other than the drawing image drawn by the user ("non-drawing image"), such as an image of a presentation material or an image of a background displayed on a display 220 provided with the electronic whiteboard 2. The electronic whiteboard 2 generates image data in RPCS based on non-drawing image data, and transmits the generated image data to the MFP 9 through the communication network 100. In another example, the electronic whiteboard 2 generates image data in PDF based on the non-drawing image data, and transmits an electronic mail attached with the generated image data to the PC 10 through the communication network 100.

In this disclosure, the image data in RPCS and the image data in PDF each is data relating to an image as a drawing image drawn by a user, or a non-drawing image displayed by a user, for example. The electronic whiteboard 2 is an example of a shared terminal to be shared by a plurality of users. The plurality of users are able to view a same image simultaneously. The IC card 3 and the smartphone 4 are an example of a privately-owned terminal, privately owned by each user. The MFP 9 is an example of a printer. The PC 10 is an example of an individual terminal operated by an individual user. The image data may be in any suitable format other than RPCS, such as in Printer Control Language (PCL), Page Description Language (PDL), and Post Script (PS).

In FIG. 1, the user A, who owns the IC card 3, brings the IC card 3 to a meeting being held with the electronic whiteboard 2. The user B, who owns the smartphone 4, brings the smartphone 4 to the meeting being held with the electronic whiteboard 2. The PC 10a is any PC owned by the user A. The PC 10b is any PC owned by the user B. In one example, the electronic whiteboard 2 may have a videoconference capability, to carry out a videoconference with the videoconference terminal 13 by communicating video data and audio data through the communication network 100.

The terminal management server 5 manages, for each privately-owned terminal, terminal identification (ID) identifying the privately-owned terminal. The file management server 8 manages file data of each user.

<Hardware Configuration>

Referring to FIGS. 2 to 7, a hardware configuration of the apparatus or terminal in the communication system 1 is described according to the embodiment.

<Hardware Configuration of Electronic Whiteboard>

Figure 2:
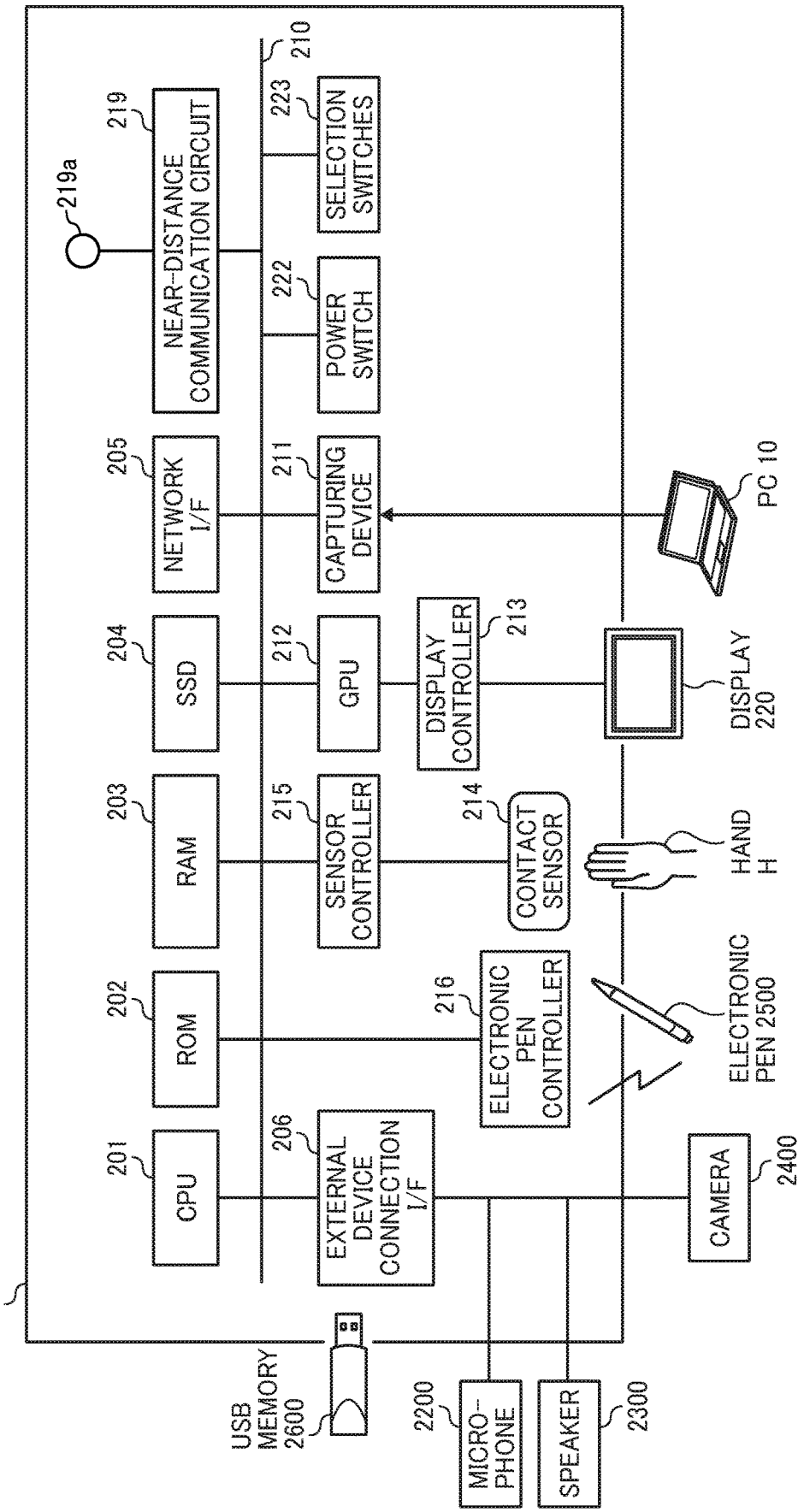
FIG. 2 is a schematic block diagram illustrating a hardware configuration of an electronic whiteboard, according to an embodiment of the present disclosure.

FIG. 2 is a diagram illustrating a hardware configuration of the electronic whiteboard 2, according to the embodiment. As illustrated in FIG. 2, the electronic whiteboard 2 includes a central processing unit (CPU) 201, a read only memory (ROM) 202, a random access memory (RAM) 203, a solid state drive (SSD) 204, a network interface (I/F) 205, and an external device connection interface (I/F) 206.

The CPU 201 controls entire operation of the electronic whiteboard 2. The ROM 202 stores a control program for controlling the CPU 201 such as an Initial Program Loader (IPL). The RAM 203 is used as a work area for the CPU 201. The SSD 204 stores various data such as the control program for the electronic whiteboard 2. The network I/F 205 controls communication with an external device through the communication network 100. The external device connection I/F 206 controls communication with a universal serial bus (USB) memory 2600, and external devices such as a camera 2400, a speaker 2300, a microphone 2200, etc.

The electronic whiteboard 2 further includes a capturing device 211, a graphics processing unit (GPU) 212, a display controller 213, a contact sensor 214, a sensor controller 215, an electronic pen controller 216, a near-distance communication circuit 219, an antenna 219a for the near-distance communication circuit 219, a power switch 222, and selection switches 223.

The capturing device 211 causes a display 508 of the PC 10 to display a still image or a video image based on image data. The GPU 212 is a semiconductor chip dedicated to processing a graphical image. The display controller 213 controls display of an image processed at the GPU 212 for output through the display 220 provided with the electronic whiteboard 2. The contact sensor 214 detects a touch onto the display 220 with an electronic pen 2500 or a user's hand H. The sensor controller 215 controls operation of the contact sensor 214. The contact sensor 214 senses a touch input to a specific coordinate on the display 220 using the infrared blocking system. More specifically, the display 220 is provided with two light receiving elements disposed on both upper side ends of the display 220, and a reflector frame disposed at the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame. The contact sensor 214 outputs an identifier (ID) of the infrared ray that is blocked by an object after being emitted from the two light receiving elements, to the sensor controller 215. Based on the ID of the infrared ray, the sensor controller 215 detects a specific coordinate that is touched by the object. The electronic pen controller 216 communicates with the electronic pen 2500 to detect a touch by the tip or bottom of the electronic pen 2500 to the display 220. The near-distance communication circuit 219 is a communication circuit that communicates in compliance with the NFC, the Bluetooth, and the like. The power switch 222 is a switch for turning on or off the power of the electronic whiteboard 2. The selection switches 223 are a group of switches for adjusting brightness, hue, etc., of display on the display 220, for example.

The electronic whiteboard 2 further includes a bus line 210. The bus line 210 is an address bus or a data bus, which electrically connects the elements in FIG. 2 such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the electronic pen 2500, the electronic pen controller 216 may also detect a touch by another part of the electronic pen 2500, such as a part held by a hand of the user.

<Hardware Configuration of IC Card>

Figure 3:
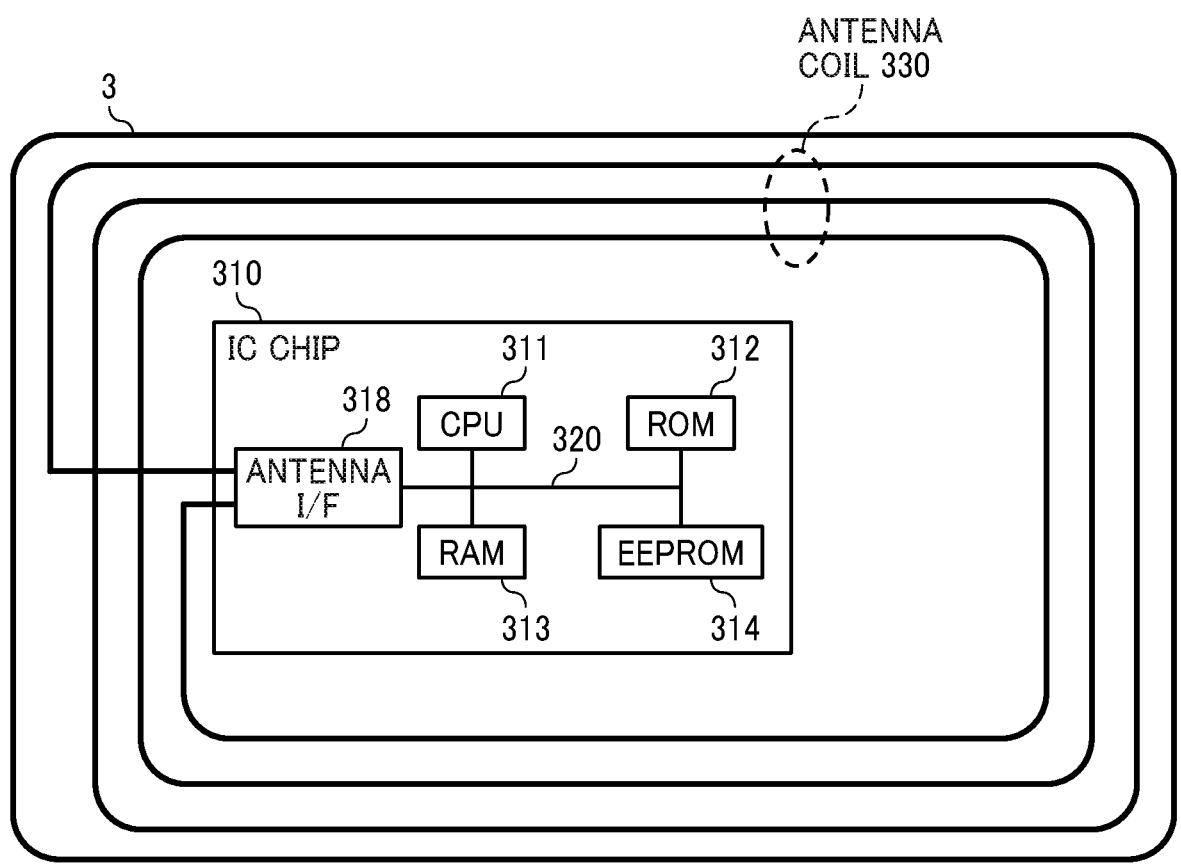
FIG. 3 is a schematic block diagram illustrating a hardware configuration of an integrated circuit (IC) card, according to an embodiment of the present disclosure.

FIG. 3 is a diagram illustrating a hardware configuration of the IC card 3 according to the embodiment. In this disclosure, the contactless IC card is described, but contact IC card may be applied instead. As illustrated in FIG. 3, the IC card 3 includes an IC chip 310 and an antenna coil 330. The IC chip 310 further includes a CPU 311, a ROM 312, a RAM 313, an Electrically Erasable and Programmable ROM (EEPROM) 314, and an antenna I/F 318.

The CPU 311 controls entire operation of the IC card 3. The ROM 312 stores a control program for operating the CPU 311. The RAM 313 is used as a work area for the CPU 311. The EEPROM 314 stores various data such as the control program for the IC card 3, and terminal ID for identifying the IC card 3, and the like. The antenna I/F 318 controls transmission or reception of data with an external device via the antenna coil 330.

The IC card 3 further includes a bus line 320. The bus line 320 is an address bus or a data bus, which electrically connects the elements in FIG. 3 such as the CPU 311.

The antenna coil 330 generates an electric current, which is induced as the IC card 3 passes an electromagnetic field generated by radio waves emitted from an external device such as a reader and writer. The IC card 3 uses the generated electric current to activate the IC chip 310, and communicates with the external device, that is the reader and writer, to obtain or provide data with the external device.

<Hardware Configuration of Smartphone>

Figure 4:
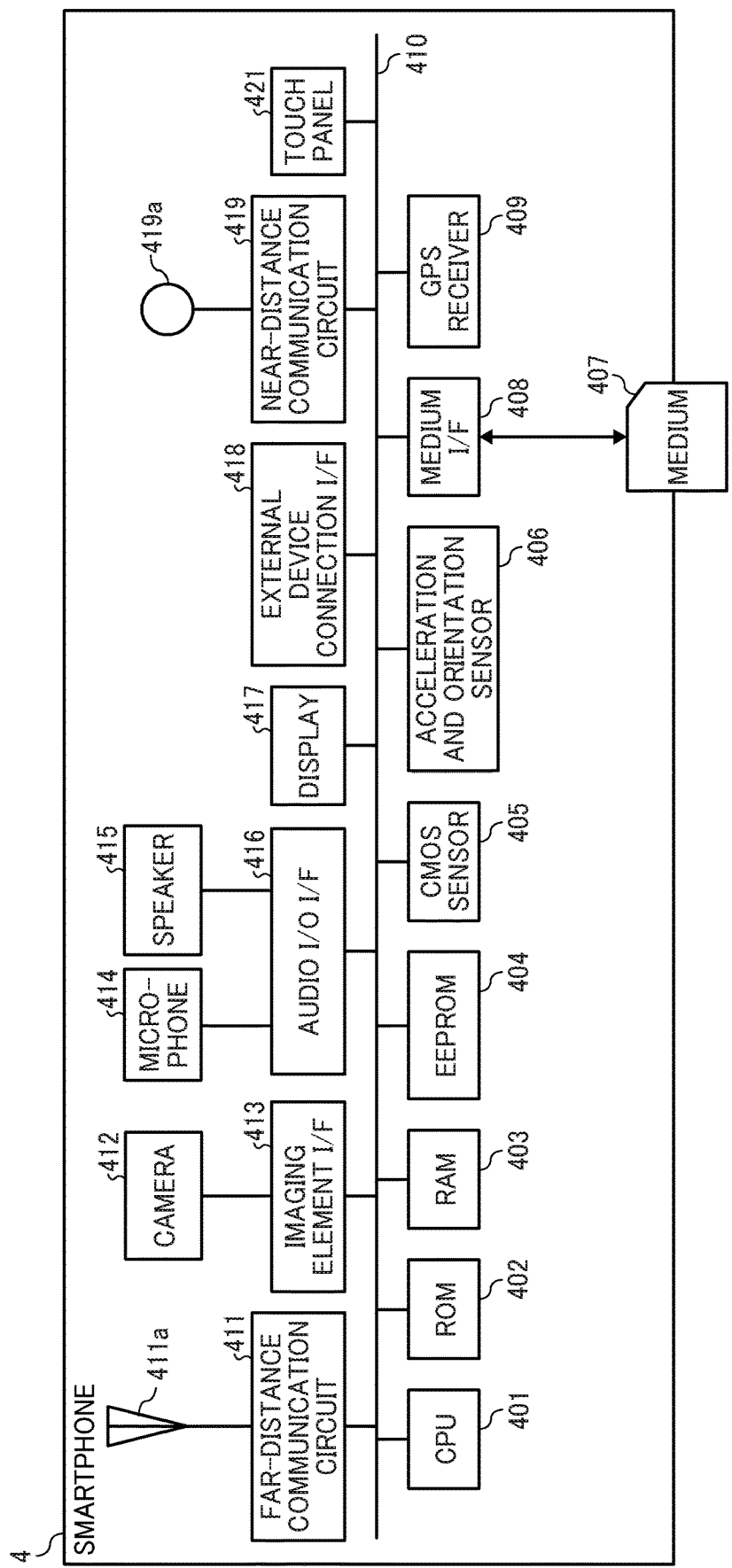
FIG. 4 is a schematic block diagram illustrating a hardware configuration of a smartphone, according to an embodiment of the present disclosure.

FIG. 4 is a diagram illustrating a hardware configuration of the smartphone 4 according to the embodiment. As illustrated in FIG. 4, the smartphone 4 includes a CPU 401, a ROM 402, a RAM 403, an EEPROM 404, a Complementary Metal Oxide Semiconductor (CMOS) sensor 405, an acceleration and orientation sensor 406, a medium I/F 408, and a global positioning system (GPS) receiver 409.

The CPU 401 controls entire operation of the smartphone 4. The ROM 402 stores a control program for controlling the CPU 401 such as an IPL. The RAM 403 is used as a work area for the CPU 401. The EEPROM 404 reads or writes various data such as a control program for the smartphone 4 under control of the CPU 401. The CMOS sensor 405 captures an object (mainly, the user operating the smartphone 4) under control of the CPU 401 to obtain captured image data. The acceleration and orientation sensor 406 includes various sensors such as an electromagnetic compass or gyrocompass for detecting geomagnetism, and an acceleration sensor. The medium IF 408 controls reading or writing of data with respect to a storage medium 407 such as a flash memory. The GPS receiver 409 receives a GPS signal from a GPS satellite.

The smartphone 4 further includes a far-distance communication circuit 411, a camera 412, an imaging element I/F 413, a microphone 414, a speaker 415, an audio input/output I/F 416, a display 417, an external device connection I/F 418, a near-distance communication circuit 419, an antenna 419a for the near-distance communication circuit 419, and a touch panel 421.

The far-distance communication circuit 411 is a circuit that communicates with other device through the communication network 100. The camera 412 is an example of built-in imaging device capable of capturing a subject to obtain image data under control of the CPU 401. The imaging element IF 413 is a circuit that controls driving of the camera 412. The microphone 414 is an example of built-in audio collecting device capable of inputting audio under control of the CPU 401. The audio input/output I/F 416 is a circuit for inputting or outputting an audio signal between the microphone 414 and the speaker 415 under control of the CPU 401. The display 417 is an example of a display device, such as a liquid crystal display and an organic electroluminescence (EL) display, which displays an image of a subject, various icons, or the like. The external device connection I/F 418 is an interface circuit that connects the smartphone 4 to various external devices. The near-distance communication circuit 419 is a communication circuit that communicates in compliance with the NFC, the Bluetooth, and the like. The touch panel 421 is an example of input device that enables the user to input a user instruction to the smartphone 4 through touching a screen of the display 417.

The smartphone 4 further includes a bus line 410. The bus line 410 is an address bus or a data bus, which electrically connects the elements in FIG. 4 such as the CPU 401.

<Hardware Configuration of Server and PC>

Figure 5:
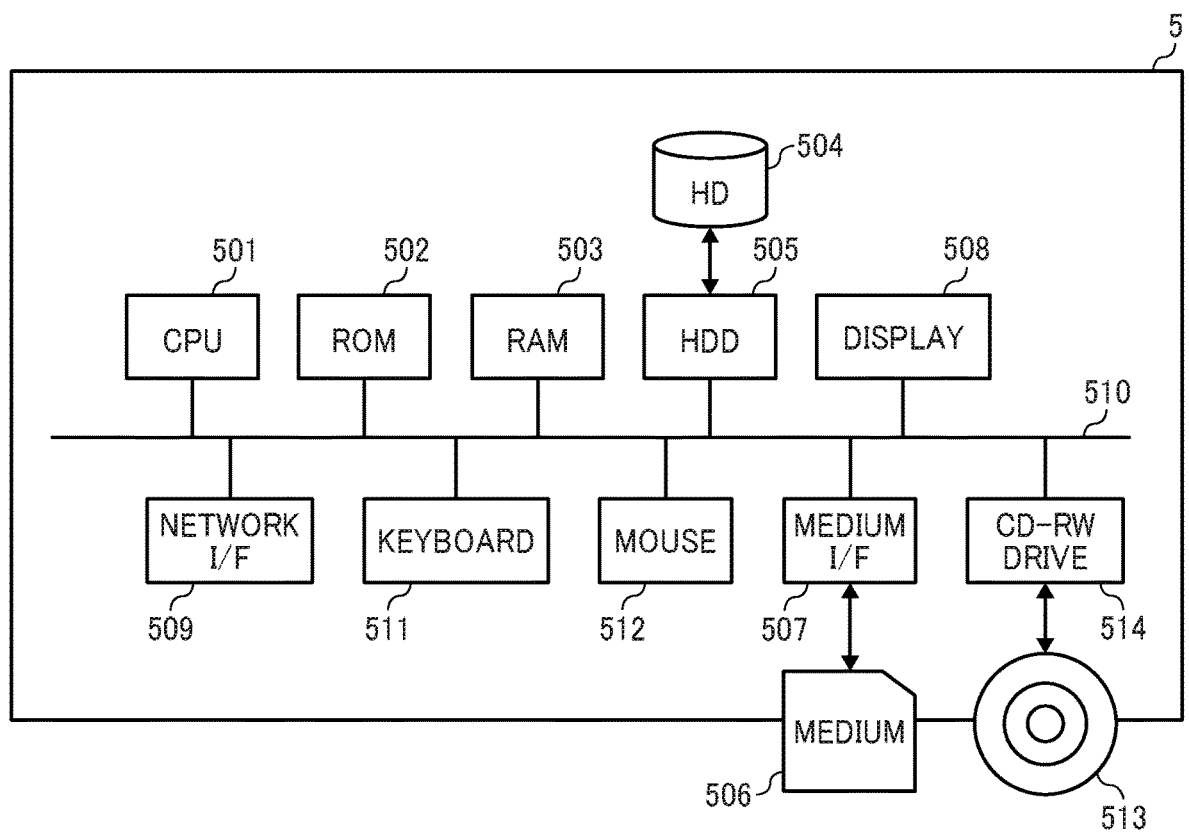
FIG. 5 is a schematic block diagram illustrating a hardware configuration of a sever or a personal computer (PC), according to an embodiment of the present disclosure.

FIG. 5 is a diagram illustrating a hardware configuration of the server and the PC, according to the embodiment. In this disclosure, since the terminal management server 5, the file management server 8, the PC 10a, and the PC 10b have substantially the same hardware structure, a hardware configuration of the terminal management server 5 is described below as an example. In the following description, even in case of describing the hardware configuration of the file management server 8, the PC 10a, and the PC 10b, the elements in FIG. 5 are referred.

As illustrated in FIG. 5, the terminal management server 5, which may be implemented by a computer, includes a CPU 501, a ROM 502, a RAM 503, a hard disk (HD) 504, a hard disk drive (HDD) 505, a storage medium 506, a medium I/F 507, a display 508, a network I/F 509, a keyboard 511, a mouse 512, a compact disc rewritable (CD-RW) drive 514, and a bus line 510.

The CPU 501 controls entire operation of the terminal management server 5. The ROM 502 stores a control program for controlling the CPU 501 such as an IPL. The RAM 503 is used as a work area for the CPU 501. The HD 504 stores various data such as a control program. The HDD 505 controls reading or writing of various data to or from the HD 504 under control of the CPU 501. The medium I/F 507 controls reading or writing of data with respect to the storage medium 506 such as a flash memory. The display 508 displays various information such as a cursor, menu, window, characters, or image. The network I/F 509 is an interface that controls communication of data with an external device through the communication network 100. The keyboard 511 is one example of input device provided with a plurality of keys for allowing a user to input characters, numerals, or various instructions. The mouse 512 is one example of input device for allowing the user to select a specific instruction or execution, select a target for processing, or move a cursor being displayed. The CD-RW drive 514 reads or writes various data with respect to a removable storage medium 513, such as a CD-RW or compact disc read only memory (CD-ROM).

The terminal management server 5 further includes a bus line 510. The bus line 510 may be an address bus or a data bus, which electrically connects various elements such as the CPU 501 of FIG. 5.

<Hardware Configuration of MFP>

Figure 6:
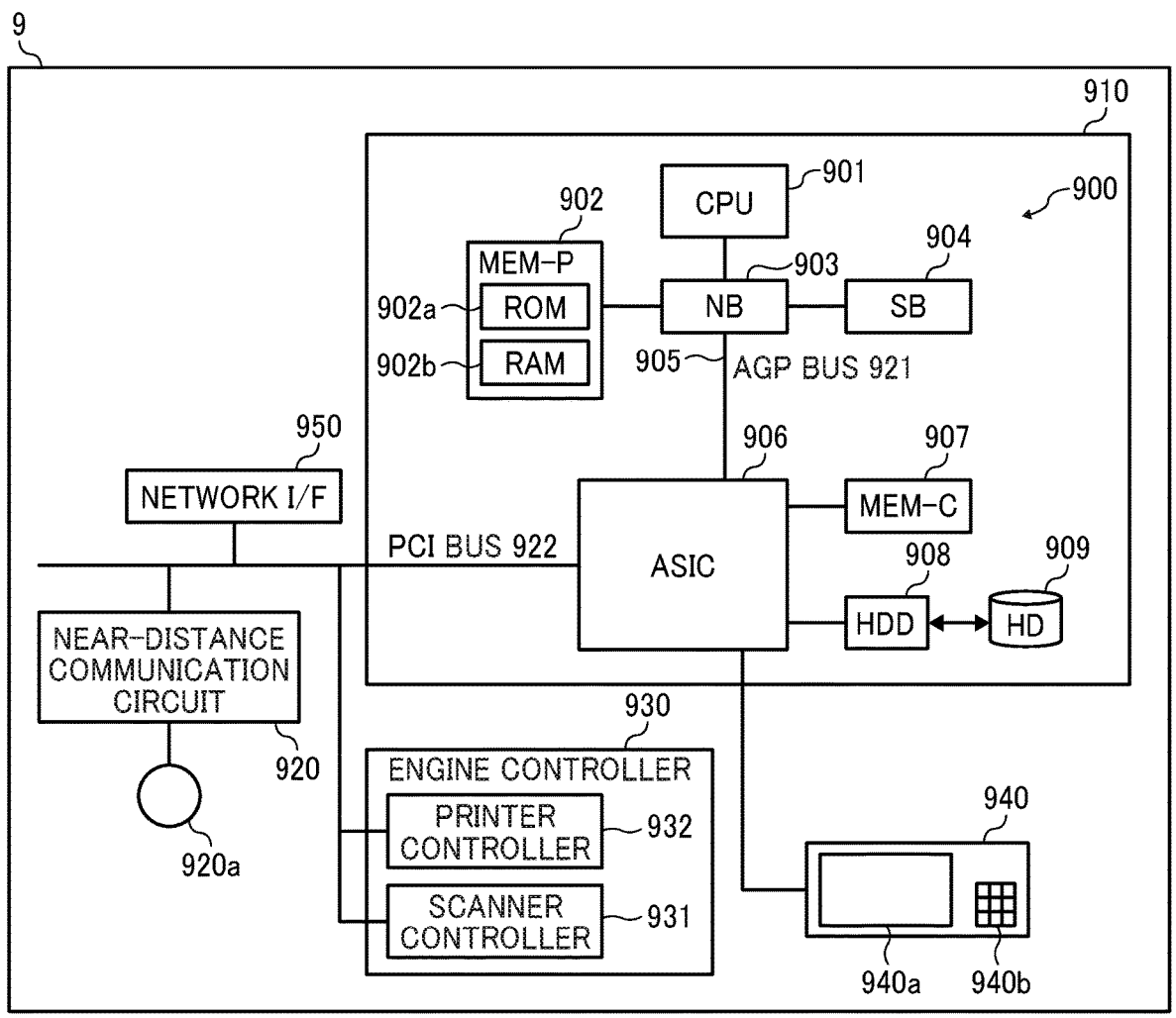
FIG. 6 is a schematic block diagram illustrating a hardware configuration of a multifunctional peripheral, product or printer (MFP), according to an embodiment of the present disclosure.

FIG. 6 is a diagram illustrating a hardware configuration of the MFP 9, according to the embodiment. As illustrated in FIG. 6, the MFP 9 includes a controller 910, a near-distance communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD 908, and an HD 909 as a storage unit. The NB 903 and the ASIC 906 are connected through an Accelerated Graphics Port (AGP) bus 921.

The CPU 901 controls entire operation of the MFP 9. The NB 903 connects the CPU 901, with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902a as a memory that stores program and data for implementing various functions of the controller 910. The MEM-P 902 further includes a RAM 902b as a memory that deploys the program and data, or as a drawing memory that stores drawing data for printing. The program stored in the RAM 902b may be stored in any computer-readable storage medium, such as a CD-ROM, floppy disk (FD), compact disc-recordable (CD-R), or digital versatile disc (DVD), in a file format installable or executable by the computer, for distribution.

The SB 904 connects the NB 903 with a PCI device or a peripheral device. The ASIC 906 is an integrated circuit (IC) dedicated to an image processing use, and connects the AGP bus 921, a PCI bus 922, the HDD 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner controller 931 and a printer controller 932 through the PCI bus 922. The ASIC 906 may be connected to a USB interface, or the Institute of Electrical and Electronics Engineers 1394 (IEEE1394) interface.

The MEM-C 907 is a local memory, which is used as a buffer for image data to be copied or code image. The HD 909 stores various image data, font data for printing, and form data. The HDD 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, the graphics accelerator card is accelerated.

The near-distance communication circuit 920 is provided with an antenna 920a for the near-distance communication circuit 920. The near-distance communication circuit 920 is a communication circuit that communicates in compliance with the NFC, the Bluetooth, and the like.

The engine controller 930 includes the scanner controller 931 and the printer controller 932. The control panel 940 includes a panel display 940a and various keys 940b. The panel display 940a is implemented by, for example, a touch panel that displays current settings or a selection screen, and receives a user input. The keys 940b, which include a numeric keypad that receives set values of various image forming parameters such as image density parameter, and a start key that accepts an instruction for starting copying. The controller 910 controls entire operation of the MFP 9. In example operation, the controller 910 controls drawing, communication, or user inputs to the control panel 940. The scanner controller 931 and the printer controller 932 each performs various image processing, such as error diffusion or gamma conversion.

In response to an instruction to select a specific application through the control panel 940, for example, using a mode switch key, the MFP 9 selectively performs a document box function, a copy function, a print function, and a facsimile function. When the document box function is selected, the MFP 9 changes its operating mode to a document box mode to store document data. With selection of the copy function, the MFP 9 operates in a copy mode. With selection of the print function, the MFP 9 operates in a printer mode. With selection of the facsimile function, the MFP 9 operates in a facsimile mode.

The network I/F 950 controls communication of data with an external device through the communication network 100. The near-distance communication circuit 920 and the network I/F 950 are electrically connected to the ASIC 906 via the PCI bus 922.

<Hardware Configuration of Videoconference Terminal>

Figure 7:
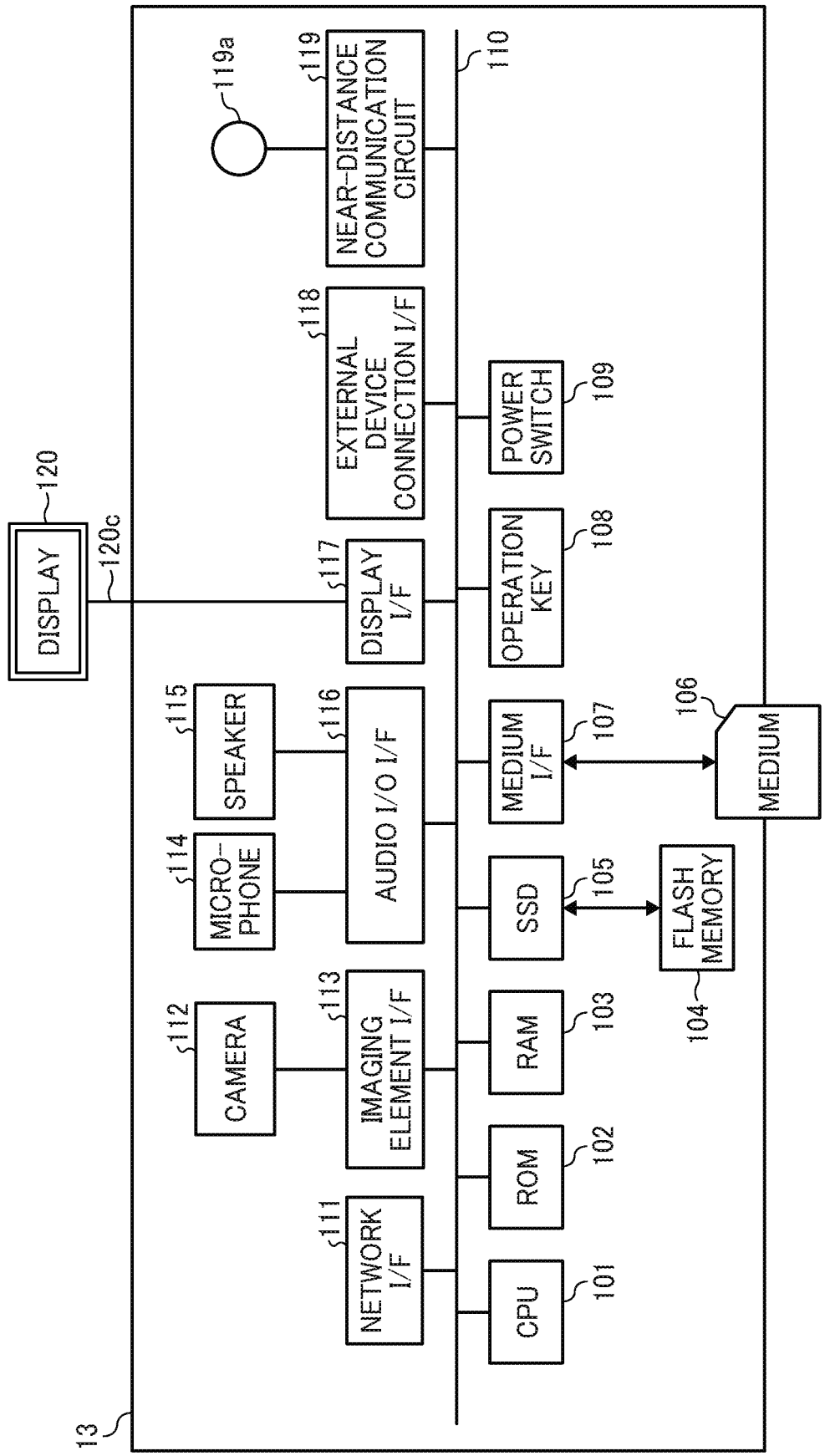
FIG. 7 is a schematic block diagram illustrating a hardware configuration of a videoconference terminal, according to an embodiment of the present disclosure.

FIG. 7 is a diagram illustrating a hardware configuration of the videoconference terminal 13 according to the embodiment. As illustrated in FIG. 7, the videoconference terminal 13 includes a CPU 101, a ROM 102, a RAM 103, a flash memory 104, an SSD 105, a medium I/F 107, an operation key 108, a power switch 109, a bus line 110, a network I/F 111, a camera 112, an imaging element I/F 113, a microphone 114, a speaker 115, an audio input/output I/F 116, a display I/F 117, an external device connection I/F 118, a near-distance communication circuit 119, and an antenna 119a for the near-distance communication circuit 119. The CPU 101 controls entire operation of the videoconference terminal 13. The ROM 102 stores a control program for controlling the CPU 101 such as an IPL. The RAM 103 is used as a work area for the CPU 101. The flash memory 104 stores various data such as a communication control program, image data, and audio data. The SSD 105 controls reading or writing of various data to or from the flash memory 104 under control of the CPU 101. In alternative to the SSD, a hard disk drive (HDD) may be used. The medium I/F 107 controls reading or writing of data with respect to a storage medium 106 such as a flash memory. The operation key (keys) 108 is operated by a user to input a user instruction such as a user selection of a communication destination of the videoconference terminal 13. The power switch 109 is a switch that turns on or off the power of the videoconference terminal 13.

The network I/F 111 allows communication of data with an external device through the communication network 100 such as the Internet. The camera 112 is an example of built-in imaging device capable of capturing a subject to obtain image data under control of the CPU 101. The imaging element I/F 113 is a circuit that controls driving of the camera 112. The microphone 114 is an example of built-in audio collecting device capable of inputting audio under control of the CPU 101. The audio input/output I/F 116 is a circuit for inputting and outputting an audio signal between the microphone 114 and the speaker 115 under control of the CPU 101. The display I/F 117 is a circuit for transmitting image data to an external display 120 under control of the CPU 101. The external device connection I/F 118 is an interface circuit that connects the videoconference terminal 13 to various external devices. The near-distance communication circuit 119 is a communication circuit that communicates in compliance with the NFC, the Bluetooth, and the like.

The bus line 110 may be an address bus or a data bus, which electrically connects various elements such as the CPU 101 of FIG. 7.

The display 120 is an example of a display device, such as a liquid crystal display or organic electroluminescence (EL) display, which displays an image of a subject, an operation icon, or the like. The display 120 is connected to the display I/F 117 by the cable 120c. The cable 120c may be an analog red green blue (RGB) (video graphic array (VGA)) signal cable, a component video cable, a high-definition multimedia interface (HDMI) (registered trademark) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used. The external device connection I/F 118 is capable of connecting an external device such as an external camera, an external microphone, or an external speaker through a USB cable or the like. In a case in which an external camera is connected, the external camera is driven in preference to the built-in camera 112 under control of the CPU 101. Similarly, in a case in which an external microphone is connected or an external speaker is connected, the external microphone or the external speaker is driven in preference to the built-in microphone 114 or the built-in speaker 115 under control of the CPU 101.

The storage medium 106 is removable from the videoconference terminal 13. The storage medium 106 can be any nonvolatile memory that reads or writes data under control of the CPU 101, such that any memory such as an EEPROM may be used instead of the flash memory 104.

<Example Screens of Electronic Whiteboard>

Figure 8A:
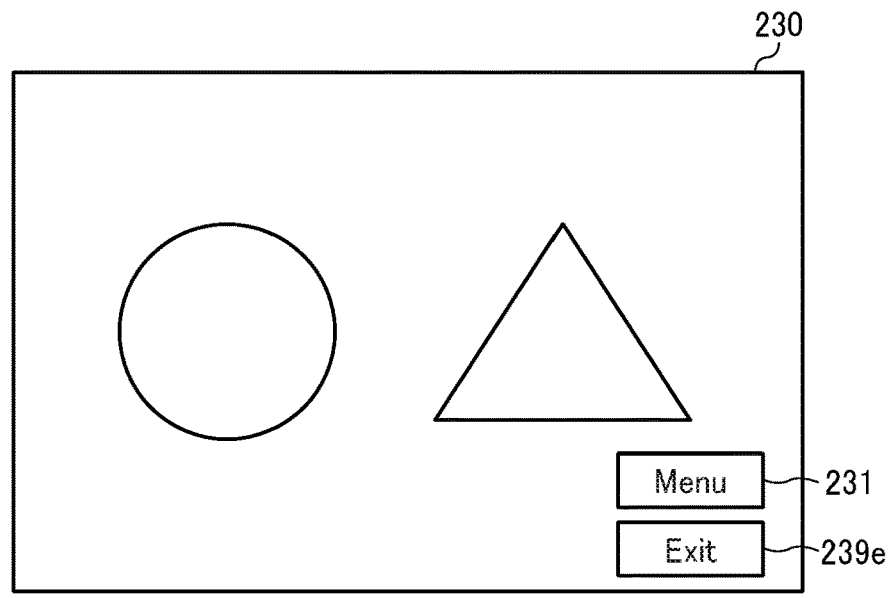
FIGS. 8A, 8B, and 8C each illustrates an example screen displayed by a display at the electronic whiteboard, according to an embodiment of the present disclosure.
Figure 8B:
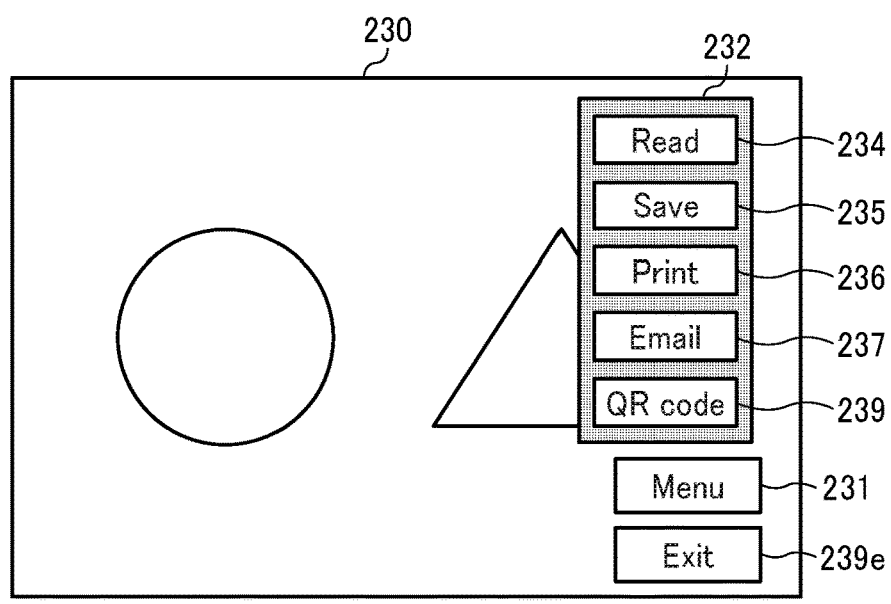
Figure 8C:
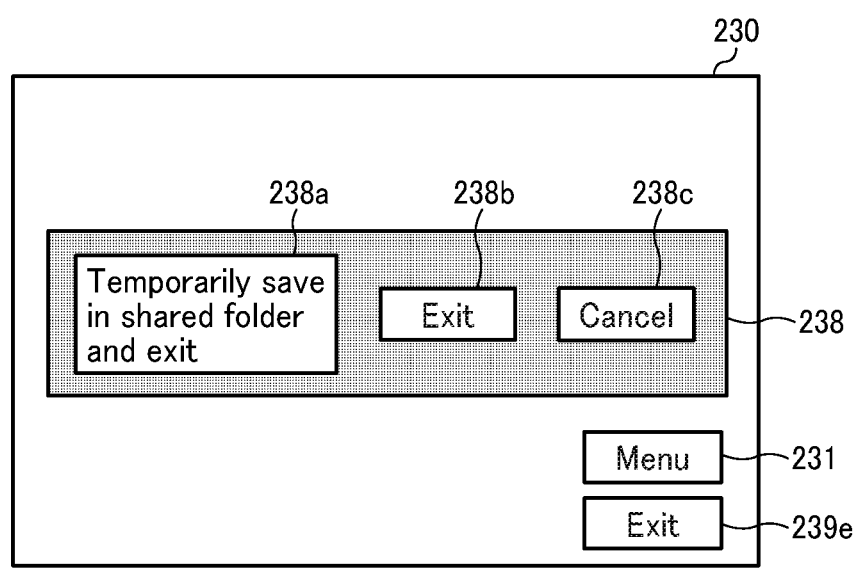

Referring to FIGS. 8A, 8B and 8C, example screens of the electronic whiteboard 2 are described according to the embodiment. FIGS. 8A, 8B, and 8C each illustrates an example screen displayed on the display 220 of the electronic whiteboard 2. The electronic whiteboard 2 displays, on the display 220, a drawing image screen 230 as illustrated in FIG. 8A, for example. The drawing image screen 230 displays a drawing image (such as a circle and a triangle in the figure) drawn by the user with such as the electronic pen 2500. The drawing image screen 230 displays a "Menu" button 231 and an "Exit" button 239e at the lower right. The "Menu" button 231 is a graphical image, which, when selected by the user, causes the electronic whiteboard 2 to perform various types of functions of the electronic whiteboard 2. The "Exit" button 239e is a graphical image, which, when selected, enables the user to log out from the electronic whiteboard 2 and causes the electronic whiteboard 2 to finish displaying a screen. When the user presses the "Menu" button 231 with such as the electronic pen 2500, as illustrated in FIG. 8B, the electronic whiteboard 2 displays, on the drawing image screen 230, a menu selection window (image) 232 for allowing selection of a function provided by the electronic whiteboard 2.

As illustrated in FIG. 8B, the menu selection window 232 includes a "Read" button 234, a "Save" button 235, a "Print" button 236, an "Email" button 237, and a "QR code" button 239.

Of those buttons, the "Read" button 234 is a graphical image, which, when selected, causes the electronic whiteboard 2 to read electronic file data of drawing image that is stored in the SSD 204 after the image is drawn, for display onto the display 220. The "Save" button 235 is a graphical image, which, when selected, causes the electronic whiteboard 2 to store the drawing image drawn by the user in the SSD 204 as electronic file data. The "Print" button 236 is a graphical image, which, when selected, causes the electronic whiteboard 2 to print the drawing image displayed on the drawing image screen 230 using such as the MFP 9. The "Email" button 237 is a graphical image, which, when selected, causes the electronic whiteboard 2 to transmit, to the PC 10a or the PC 10b, etc., the drawing image displayed on the drawing image screen 230, as the drawing image data attached to the email. The "QR code" button 239 is a graphical image, which, when selected, causes the electronic whiteboard 2 to display, on the display 220, a QR code (registered trademark) embedded with a device ID identifying the own device (that is, the electronic whiteboard 2).

When the user presses the "Exit" button 239e with such as the electronic pen 2500, as illustrated in FIG. 8C, the electronic whiteboard 2 displays, on the drawing image screen 230, an exit window 238 for logging out and finishing the display.

As illustrated in FIG. 8C, the exit window 238 includes a "Temporarily save in shared folder and exit" button 238a, an "Exit" button 238b, and a "Cancel" button 238c.

The "Temporarily save in shared folder and exit" button 238a is a graphical image, which, when selected, causes the electronic whiteboard 2 to temporarily store the drawing image data, allows the user to log out from the electronic whiteboard 2, and causes the electronic whiteboard 2 to finish display. The "Exit" button 238b is a graphical image, which, when selected, allows the user to log out from the electronic whiteboard 2, and causes the electronic whiteboard 2 to finish display, without temporarily storing the drawing image data. In other words, an image representing the drawing image data is not displayed (redisplayed) the next time a user logs in. The "Cancel" button 238c is a graphical image, which, when selected, causes the electronic whiteboard 2 to finish display of the exit window 238 and return to the drawing image screen 230 illustrated in FIG. 8A.

Any one of the IDs described above is an example of identification information identifying the device or terminal, or the user operating the device or terminal. The device ID is an example of device identification information. The terminal ID is an example of terminal identification information. The user ID is an example of user identification information. Further, the device identification information and the terminal identification information include a production serial number. Furthermore, the user identification information includes an employee number, a driver license number, and an individual number called "My Number" under the Japan's Social Security and Tax Number System.

Further, any one of the above-described control programs may be recorded in a file in a format installable or executable on a computer-readable storage medium for distribution. Examples of the storage medium include, but not limited to, a CD-R, DVD, blue-ray disc, and SD card. In addition, such storage medium may be provided in the form of a program product to users within a certain country or outside that country.

Each of the servers 5 and 8 may be configured by a single computer or a plurality of computers to which divided portions (functions, means, or storages) are arbitrarily allocated.

<Functional Configuration of Communication System>

Figure 9A:
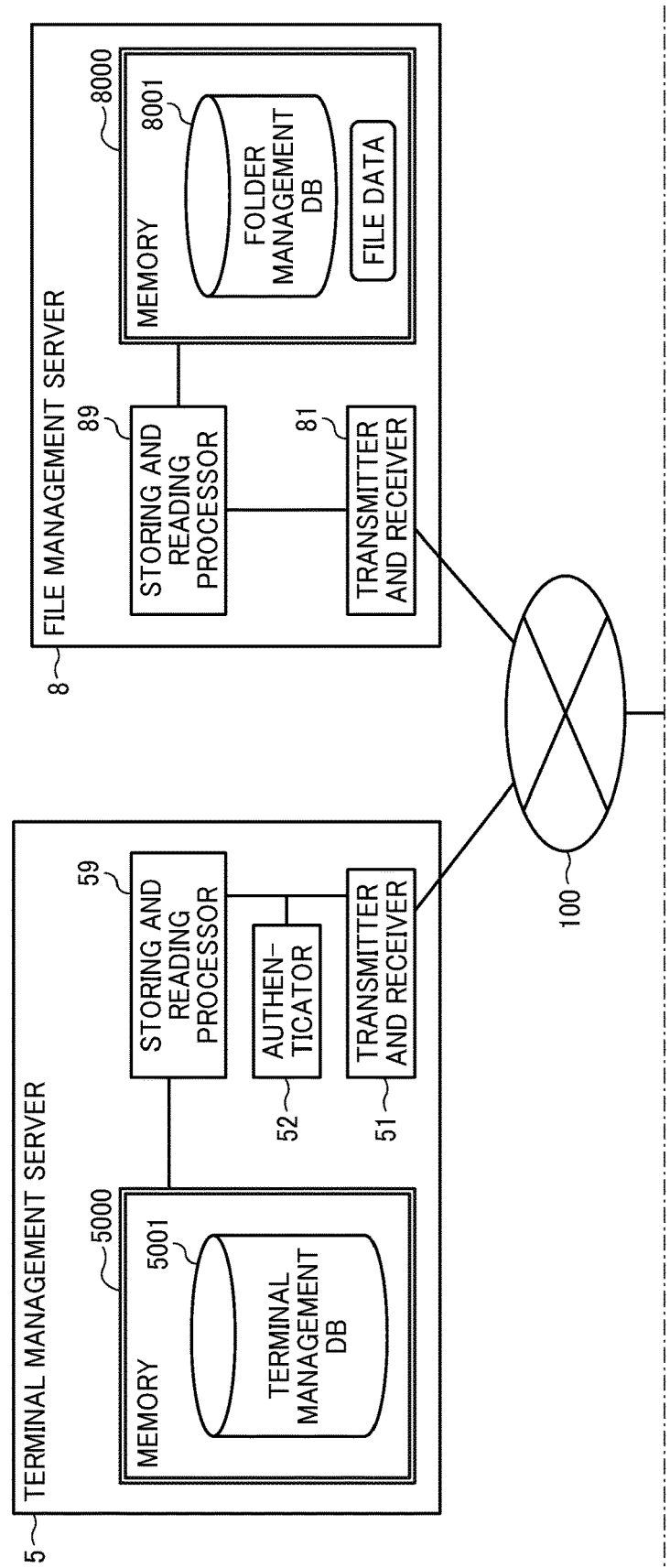
FIGS. 9A and 9B are a schematic block diagram illustrating a functional configuration of the communication system, according to an embodiment of the present disclosure.
Figure 9B:
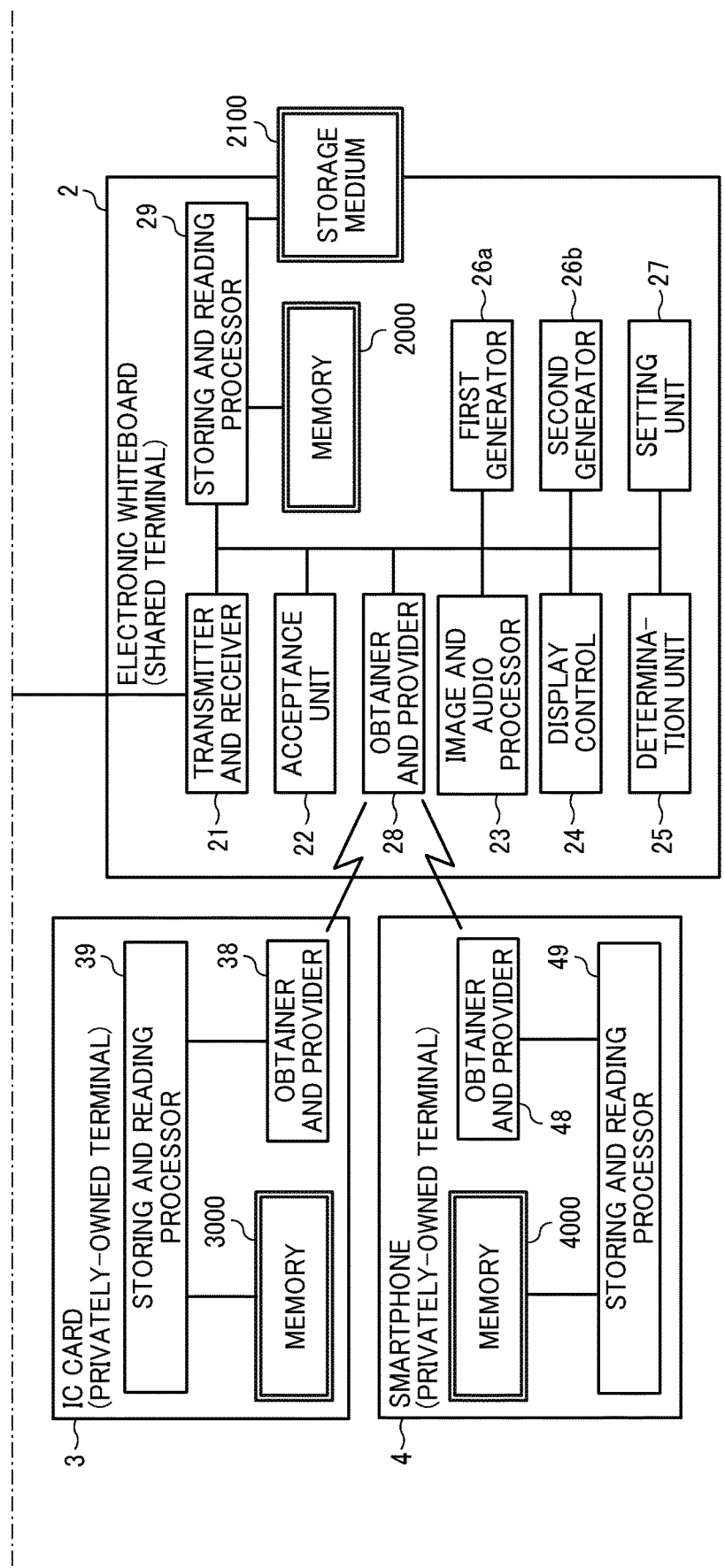

Referring to FIGS. 9A and 9B and FIGS. 10A and 10B, a functional configuration of the communication system 1 is described according to the embodiment. FIGS. 9A and 9B are a block diagram illustrating a functional configuration of the communication system 1. In FIGS. 9A and 9B, only a part of those terminals, devices, and servers illustrated in FIG. 1 is illustrated, which relates to processing or operation described below.

<Functional Configuration of Electronic Whiteboard>

As illustrated in FIG. 9B, the electronic whiteboard 2 includes a transmitter and receiver 21, an acceptance unit 22, an image and audio processor 23, a display control 24, a determination unit 25, a first generator 26a, a second generator 26b, a setting unit 27, an obtainer and provider 28, and a storing and reading processor 29. These units are functions that are implemented by or that are caused to function by operating any of the elements illustrated in FIG. 2 in cooperation with the instructions of the CPU 201 according to the electronic whiteboard control program expanded from the SSD 204 to the RAM 203. The electronic whiteboard 2 further includes a memory 2000, which is implemented by the RAM 203 and SSD 204 illustrated in FIG. 2.

(Each Functional Unit of Electronic Whiteboard)

Next, each functional unit of the electronic whiteboard 2 is described according to the embodiment. The transmitter and receiver 21, which may be implemented by the instructions of the CPU 201, the network I/F 205, and the external device connection I/F 206, illustrated in FIG. 2, transmits or receives various types of data (or information) to or from other terminal, apparatus, or system through the communication network 100.

The acceptance unit 22, which is implemented by the instructions of the CPU 201, the contact sensor 214, and the electronic pen controller 216, illustrated in FIG. 2, accepts various inputs from the user.

The image and audio processor 23, which is implemented by the instructions of the CPU 201, illustrated in FIG. 2, applies image processing to image data that is obtained by capturing a subject by the camera 2400. After the audio of the user is converted to an audio signal by the microphone 2200, the image and audio processor 23 applies processing to audio data according to this audio signal. The image and audio processor 23 outputs the audio signal according to the audio data to the speaker 2300, and the speaker 2300 outputs audio. The image and audio processor 23 obtains drawing image data, drawn by the user with the electronic pen 2500 or the user's hand H onto the display 220, and converts the drawing image data to coordinate data. For example, when the electronic whiteboard 2x transmits the coordinate data to the electronic whiteboard 2y at another site, the electronic whiteboard 2y controls the display 220 of the electronic whiteboard 2y to display a drawing image having the same content based on the received coordinate data.

The display control 24, which is implemented by the instructions of the CPU 201 illustrated in FIG. 2 and by the display controller 213 illustrated in FIG. 2, controls the display 220 to display a drawing image.

The determination unit 25, which is implemented by the instructions of the CPU 201 illustrated in FIG. 2, determines whether the electronic whiteboard 2 has received any terminal ID, for example, from the IC card 3 or the smartphone 4.

The first generator 26a, which is implemented by the instructions of the CPU 201 illustrated in FIG. 2, generates image data in PDF, from the drawing image data in bitmap that has been generated based on drawing by the user. The second generator 26b, which is implemented by the instructions of the CPU 201 illustrated in FIG. 2, generates image data in RPCS, from the drawing image data in bitmap that has been generated based on drawing by the user. The image data may be in any suitable format other than RPCS, such as in PDL or PS.

The setting unit 27, which is implemented by the instructions of the CPU 201 illustrated in FIG. 2, configures settings such as an email sender, an email destination, or a print requester name of a user who requests printing in accordance with print data.

The obtainer and provider 28, which is implemented by the instructions of the CPU 201 and the near-distance communication circuit 219 with the antenna 219a, illustrated in FIG. 2, communicates with the IC card 3 or the smartphone 4 to obtain or provide data from or to the IC card 3 or the smartphone 4 by near-distance communication.

The storing and reading processor 29, which is implemented by the instructions of the CPU 201 and the SSD 204 illustrated in FIG. 2, performs processing to store various types of data in the memory 2000 or a storage medium 2100 or to read various types of data stored in the memory 2000 or the storage medium 2100. Further, every time image data and audio data are received in performing communication with other electronic whiteboard or videoconference terminal, the memory 2000 overwrites the image data and audio data. The display 220 displays an image based on image data before being overwritten, and the speaker 2300 outputs audio based on audio data before being overwritten. The storage medium 2100 is implemented by the USB memory 2600 illustrated in FIG. 2.

<Functional Configuration of IC Card>

As illustrated in FIG. 9B, the IC card 3 includes an obtainer and provider 38, and a storing and reading processor 39. These units are functions that are implemented by or that are caused to function by operating any of the elements illustrated in FIG. 3 in cooperation with the instructions of the CPU 311 according to the IC card control program expanded from the EEPROM 314 to the RAM 313. The IC card 3 further includes a memory 3000, which is implemented by the RAM 313 and the EEPROM 314 illustrated in FIG. 3.

(Each Functional Unit of IC Card)

Next, each functional unit of the IC card 3 is described according to the embodiment. The obtainer and provider 38, which is implemented by the instructions of the CPU 311 and the antenna coil 330 illustrated in FIG. 3, communicates with the electronic whiteboard 2 to obtain or provide data from or to the electronic whiteboard 2 by near-distance communication.

The storing and reading processor 39, which is implemented by the instructions of the CPU 311 illustrated in FIG. 3, performs processing to store various types of data in the memory 3000 or read various types of data stored in the memory 3000. The memory 3000 stores a terminal ID for identifying the IC card as one example of privately-owned terminal.

<Functional Configuration of Smartphone>

As illustrated in FIG. 9B, the smartphone 4 includes an obtainer and provider 48 and a storing and reading processor 49. These units are functions that are implemented by or that are caused to function by operating any of the elements illustrated in FIG. 4 in cooperation with the instructions of the CPU 401 according to the smartphone control program expanded from the EEPROM 404 to the RAM 403. The smartphone 4 further includes a memory 4000, which is implemented by the RAM 403 and the EEPROM 404 illustrated in FIG. 4.

(Each Functional Unit of Smartphone)

Next, each functional unit of the smartphone 4 is described according to the embodiment. The obtainer and provider 48, which is implemented by the instructions of the CPU 401 and the near-distance communication circuit 419 with the antenna 419a, illustrated in FIG. 4, communicates with the electronic whiteboard 2 to obtain or provide data from or to the electronic whiteboard 2 by near-distance communication.

The storing and reading processor 49, which is implemented by the instructions of the CPU 401 illustrated in FIG. 4, performs processing to store various types of data in the memory 4000 or read various types of data stored in the memory 4000. The memory 4000 stores a terminal ID for identifying the smartphone 4 as one example of privately-owned terminal.

<Functional Configuration of Terminal Management Server>

The terminal management server 5 includes a transmitter and receiver 51, an authenticator 52, and a storing and reading processor 59. These units are functions that are implemented by or that are caused to function by operating any of the elements illustrated in FIG. 5 in cooperation with the instructions of the CPU 501 according to the terminal control program expanded from the HD 504 to the RAM 503. The terminal management server 5 includes a memory 5000, which is implemented by the HD 504 illustrated in FIG. 5.

(Terminal Management Table)

FIG. 10A is a conceptual diagram illustrating a terminal management table according to the embodiment. The memory 5000 stores a terminal management DB 5001, which is implemented by the terminal management table illustrated in FIG. 10A. This terminal management table stores, for each one of a plurality of privately-owned terminals (IC card 3, smartphone 4) registered to the terminal management server 5, a user ID identifying a user who owns the privately-owned terminal and a user name in association with the terminal ID identifying the privately-owned terminal.

(Each Functional Unit of Terminal Management Server)

Next, each functional unit of the terminal management server 5 is described in detail according to the embodiment. In the following description of the functional configuration of the terminal management server 5, relationships of one or more hardware elements in FIG. 5 with each functional unit of the terminal management server 5 in FIG. 9A will also be described.

The transmitter and receiver 51 of the terminal management server 5 illustrated in FIG. 9A, which is implemented by the instructions of the CPU 501 illustrated in FIG. 5 and by the network I/F 509 illustrated in FIG. 5, transmits or receives various types of data (or information) to or from another terminal, device, or system via the communication network 100.

The authenticator 52, which is implemented by the instructions of the CPU 501 illustrated in FIG. 5, determines whether a terminal ID transmitted from the electronic whiteboard 2 is a privately-owned terminal (IC card 3, smartphone 4) owned by the authorized user, which is previously registered.

The storing and reading processor 59, which is implemented by the instructions of the CPU 501 illustrated in FIG. 5 and the HDD 505 illustrated in FIG. 5, performs processing to store various types of data in the memory 5000 or read various types of data stored in the memory 5000.

<Functional Configuration of File Management Server>

The file management server 8 includes a transmitter and receiver 81, and a storing and reading processor 89. These units are functions that are implemented by or that are caused to function by operating any of the elements illustrated in FIG. 5 in cooperation with the instructions of the CPU 501 according to a folder control program expanded from the HD 504 to the RAM 503. The file management server 8 further includes a memory 8000, which is implemented by the HD 504 illustrated in FIG. 5.

(Folder Management Table)

FIG. 10B is a conceptual diagram illustrating a folder management table according to the embodiment. The memory 8000 stores a folder management DB 8001, which is implemented by the folder management table illustrated in FIG. 10B. The folder management table stores, for each of one or more registered users being managed by the file management server 8, a user ID identifying the user and a folder name of the user's private electronic folder, in association with each other.

(Each Functional Unit of File Management Server)

Next, each functional unit of the file management server 8 will be described in detail. In the following description of the functional configuration of the file management server 8, relationships of one or more hardware elements in FIG. 5 with each functional unit of the file management server 8 in FIG. 9A will also be described.

The transmitter and receiver 81 of the file management server 8 illustrated in FIG. 9A, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 89, which is implemented by the instructions of the CPU 501 illustrated in FIG. 5 and the HDD 505 illustrated in FIG. 5, performs processing to store various types of data in the memory 8000 or read various types of data stored in the memory 8000.

<Operation>

In the following, operations, performed by the communication system 1, are described according to embodiments of the present disclosure. The following describes an example case in which the user A and the user B are having a meeting in a certain meeting room using the electronic whiteboard 2x, as illustrated in FIG. 1. In this example, the user A performs a login process, and the user A or the user B loads (reads out) the user's own electronic file data. In the following description, requests and results are transmitted and received as data (information).

<Login Process>

Figure 11:
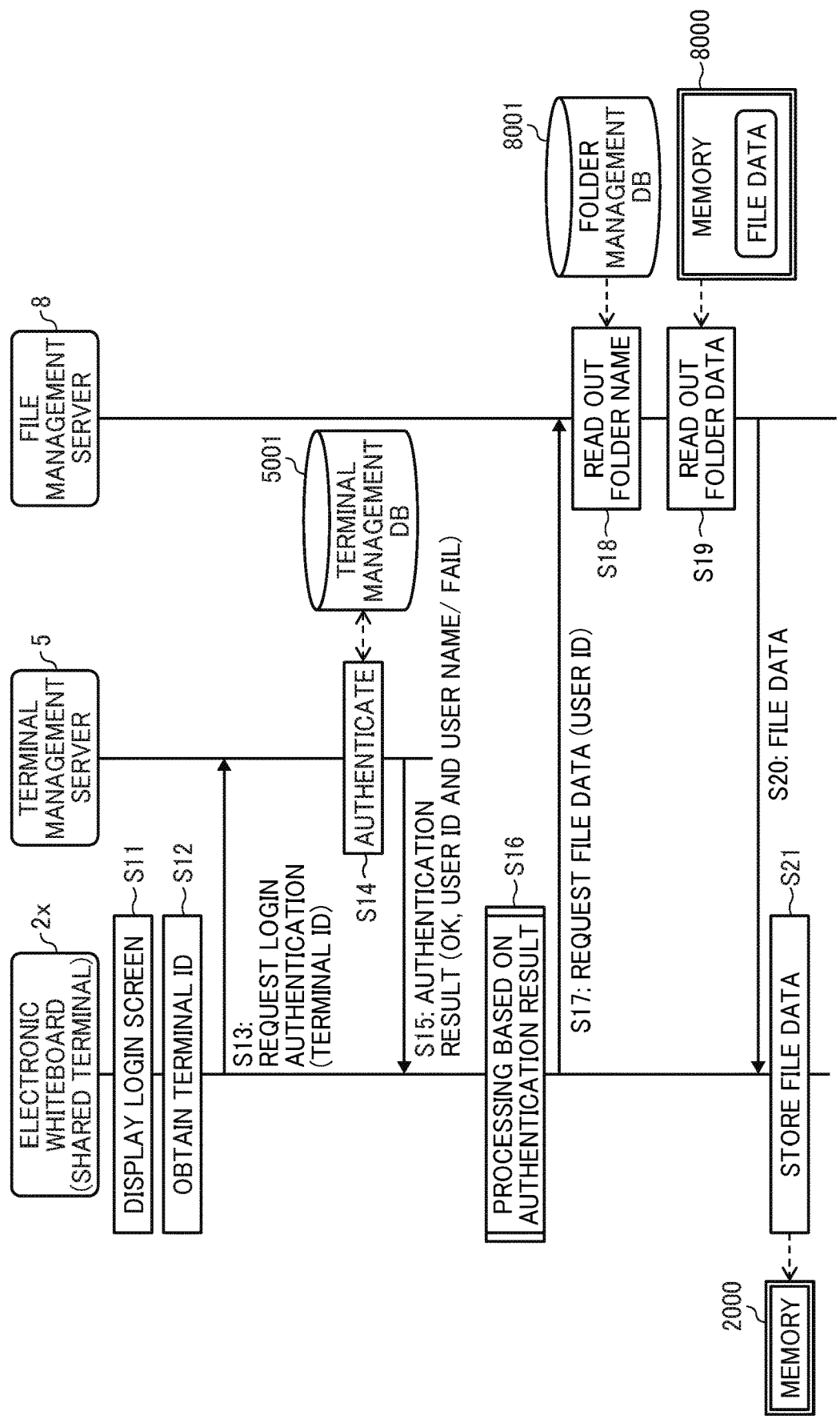
FIG. 11 is a sequence diagram illustrating a login process, according to an embodiment of the present disclosure.
Figure 13:
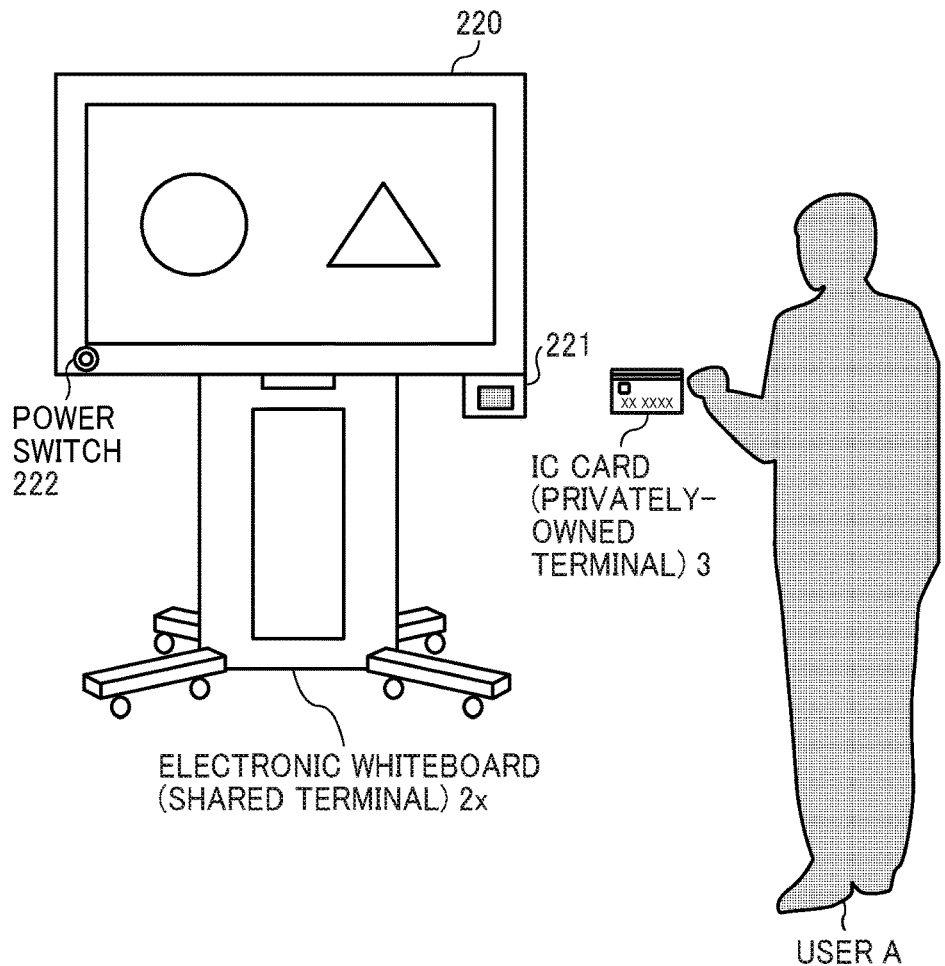
FIG. 13 is an illustration for explaining a use scenario of the electronic whiteboard, according to an embodiment of the present disclosure.

Referring to FIGS. 11 to 14, a description is given of a login process performed by the user A to the electronic whiteboard 2x. FIG. 11 is a sequence diagram illustrating a login process according to the embodiment. FIGS. 12A, 12B, and 12C each illustrates an example screen displayed on the display 220 of the electronic whiteboard 2x. FIG. 13 is an illustration for explaining a use scenario of the electronic whiteboard 2x, according to the embodiment.

As illustrated in FIG. 13, in response to pressing of the power switch 222 of the electronic whiteboard 2x by the user, the display control 24 controls the display 220 to display a login screen 170 as illustrated in FIG. 12A (S11). Next, as illustrated in FIG. 13, when the user A brings his or her IC card 3 in proximity of a near-distance communication device 221 (or the user A holds the IC card 3 over the near-distance communication device 221) of the electronic whiteboard 2x, the obtainer and provider 28 of the electronic whiteboard 2x obtains the terminal ID of the IC card from the obtainer and provider 38 of the IC card 3 (S12). The near-distance communication device 221 corresponds to the near-distance communication circuit 219. The transmitter and receiver 21 of the electronic whiteboard 2x transmits a request for login authentication to the terminal management server 5 (S13). This request for login authentication includes the terminal ID obtained at S12. The terminal management server 5 receives the request for login authentication at the transmitter and receiver 51.

Next, the authenticator 52 of the terminal management server 5 performs login authentication of the IC card 3 using the terminal ID that is obtained (S14). More specifically, the storing and reading processor 59 searches the terminal management table (FIG. 10A) using the terminal ID received at S13 as a search key, to obtain the user ID associated with the terminal ID. When the user ID associated with the terminal ID is found, the authenticator 52 confirms the terminal ID of the IC card 3 to determine that the IC card 3 (terminal ID) is a legitimate IC card owned by the authorized user identified with the user ID that is found. When the user ID associated with the terminal ID is not found, the authenticator 52 determines that the IC card 3 (terminal ID) is not a legitimate IC card owned by the authorized user.

Next, the transmitter and receiver 51 of the terminal management server 5 transmits an authentication result to the electronic whiteboard 2x (S15). When the authenticator 52 determines that the IC card 3 is a legitimate IC card, the authentication result includes information indicating that the IC card 3 is a legitimate IC card, the user ID identifying the user who owns the IC card 3, and the user name. When the authenticator 52 determines that the IC card 3 is not a legitimate IC card, the authentication result includes information indicating that the IC card 3 is not a legitimate IC card. The electronic whiteboard 2x receives the authentication result at the transmitter and receiver 21.

Figure 14:
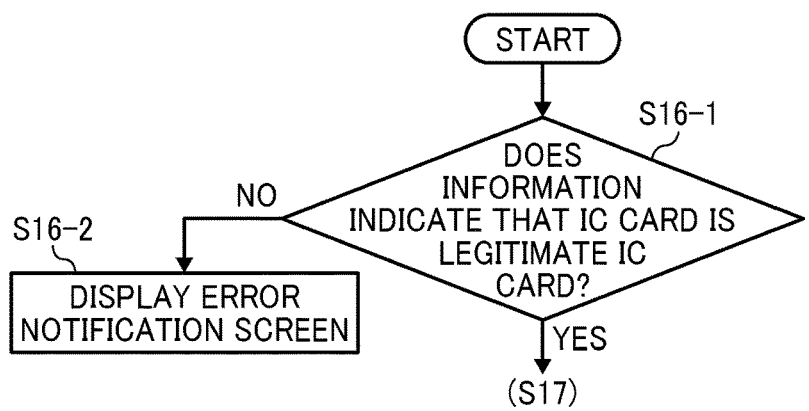
FIG. 14 is a flowchart illustrating a process according to an authentication result when logging in, according to an embodiment of the present disclosure.

Next, the electronic whiteboard 2x performs an operation based on the authentication result (S16). Referring to FIG. 14, a description is given of S16 of the operation performed based on the authentication result. FIG. 14 is a flowchart illustrating an operation performed according to the authentication result when logging in.

As illustrated in FIG. 14, the determination unit 25 determines whether information included in the authentication result received at S15 indicates that the IC card 3 is a legitimate IC card (S16-1). In other words, the determination unit 25 determines whether the terminal ID transmitted at S13 is a legitimate terminal ID. When the determination unit 25 determines that the information included in the authentication result indicates that the IC card 3 is not a legitimate IC card, i.e., that login has failed (S16-1: NO), the display control 24 controls the display 220 to display an error notification screen 180 as illustrated in FIG. 12B (S16-2). When the determination unit 25 determines that the information included in the authentication result indicates that the IC card 3 is a legitimate IC card, i.e., that login is successful (S16-1: YES), the operation proceeds to S17. The following describes a case in which the authentication result includes the information indicating that the IC card 3 is a legitimate IC card.

The transmitter and receiver 21 of the electronic whiteboard 2x transmits a request for electronic file data to the file management server 8 (S17). This request includes the user ID that is received at S15. The file management server 8 receives the request for electronic file data at the transmitter and receiver 81.

Next, the storing and reading processor 89 of the file management server 8 searches the folder management table (FIG. 10B), using the user ID received at S17 as a search key, to obtain an electronic folder name associated with the user ID (S18). Further, the storing and reading processor 89 reads out all items of electronic file data saved (stored) in an electronic folder relating to the electronic folder name that is read out at S18 from the memory 8000 (S19). The transmitter and receiver 81 transmits, to the electronic whiteboard 2x, the all items of electronic file data in response to the request for electronic file data (S20). The electronic whiteboard 2x receives the response to the request for electronic file data at the transmitter and receiver 21.

Next, the storing and reading processor 29 of the electronic whiteboard 2x stores the all items of electronic file data received at S20 in a private electronic folder of the user A in the memory 2000 (S21). In this case, the electronic folder name of the private folder of the user A stored in the memory 2000 includes the user name that is received at S15. The electronic file data is not displayed on the display 220 until the electronic file data is read out (loaded) in accordance with an instruction by the user A.

Further, the display control 24 controls the display 220 to display a drawing start screen 190 that includes a ticker such as "Welcome, Mr. Kato", indicating that the user is able to start drawing, as illustrated in FIG. 12C. This text "Kato" is generated using the user name that is received at 815. Thus, the user A and the user B are able to start drawing on the electronic whiteboard 2x.

<Loading Electronic File Data>

Figure 15:
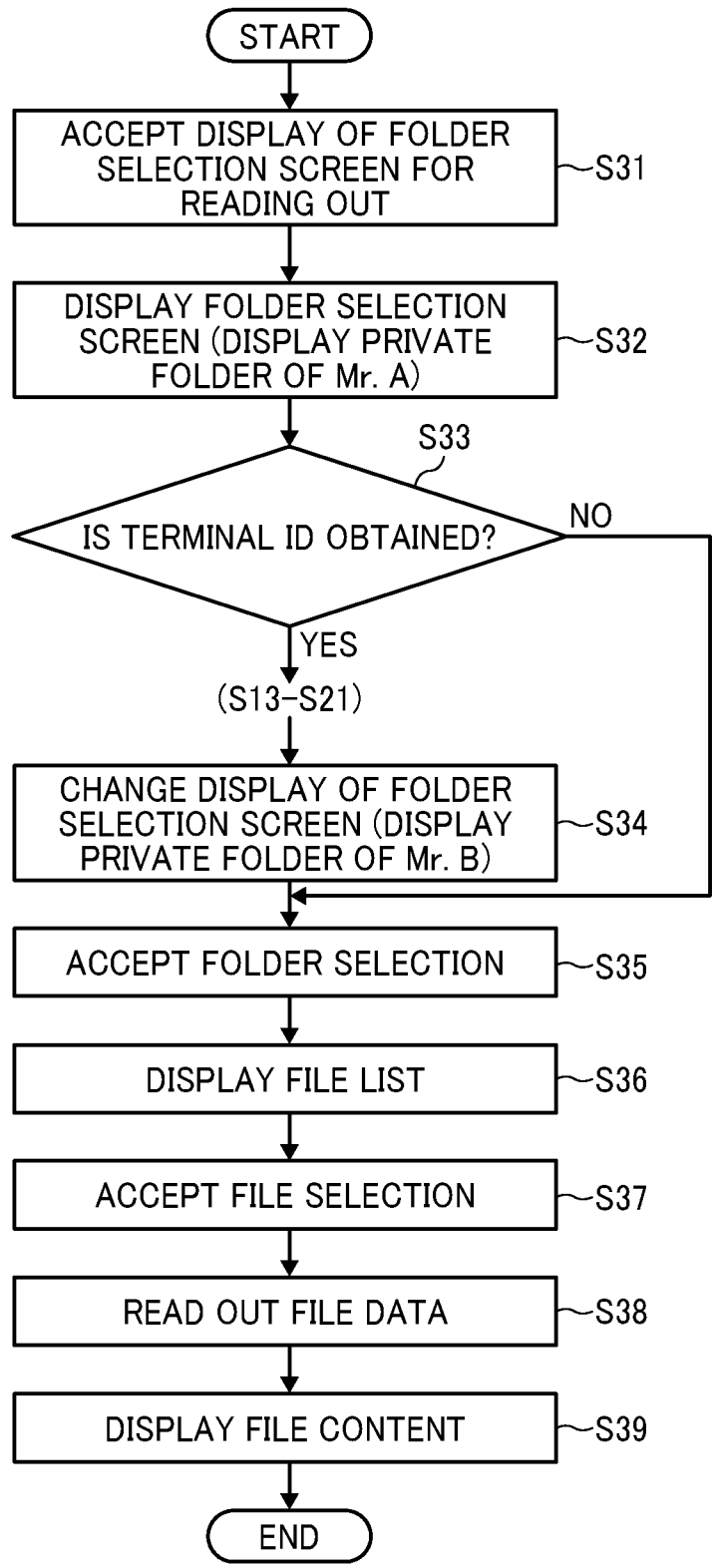
FIG. 15 is a flowchart illustrating an operation of loading electronic file data, according to an embodiment of the present disclosure.

First, a description is given of an operation of loading electronic file data, with reference to FIG. 15 and FIGS. 16A to 16D. FIG. 15 is a flowchart illustrating an operation of loading electronic file data. FIGS. 16A, 16B, 16C and 16D each illustrates an example screen displayed on the display 220 of the electronic whiteboard 2.

Figure 16A:
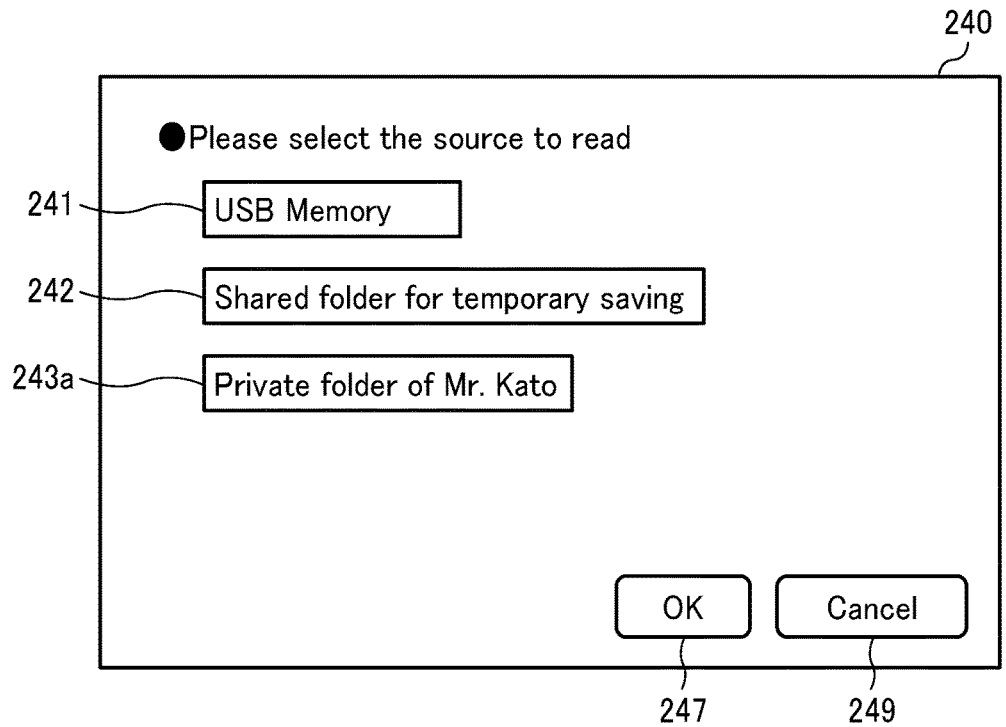
FIGS. 16A, 16B, 16C and 16D each illustrates an example screen displayed by the display at the electronic whiteboard, according to an embodiment of the present disclosure.

When the user A (Kato) who has logged in the electronic whiteboard 2 presses (touches) the "read" button 234 illustrated in FIG. 8B, the acceptance unit 22 accepts an instruction for displaying a folder selection screen 240 for selecting a folder from which electronic file data is read (S31). The display control 24 controls the display 220 to display the folder selection screen 240 as illustrated in FIG. 16A (S32). This folder selection screen 240 includes a "USB memory" button 241, a "Shared folder for temporary saving" button 242, and a "Private folder of Mr. Kato" button 243a. The "USB memory" button 241 is a graphical image, which, when selected, causes the electronic whiteboard 2 to load (read out) file data from the USB memory 2600 illustrated in FIG. 2. The "Shared folder for temporary saving" button 242 is a graphical image, which, when selected, causes the electronic whiteboard 2 to load (read out) file data that is stored in a shared folder of the memory 2000 in response to selection of the "Temporarily save in shared folder and exit" button 238a illustrated in FIG. 8C. The "Private folder of Mr. Kato" button 243a is a graphical image, which, when selected, causes the electronic whiteboard 2 to load (read out) file data from a private folder of the user A (Mr. Kato) stored in the memory 8000 of the file management server 8. The display control 24 displays "Kato" in the button 243a by using the user name transmitted from the terminal management server 5 at S15 (see FIG. 11). Thus, when the folder selection screen 240 for selecting a folder from which electronic file data is read is displayed, the button 243a including the name of the user A who has logged in the electronic whiteboard 2 is displayed by default. In addition, at the lower part of the folder selection screen 240 (see FIGS. 16A and 16C), an "OK" button 246 and a "Cancel" button 249 are displayed. The "OK" button 246 is a graphical image, which, when selected, enables a user to confirm selection of the folder, after any one of the buttons 241, 242 and 243a (243b) is selected. The "Cancel" button 249 is a graphical image, which, when selected, enables the user to cancel the selection of the folder.

Figure 16B:
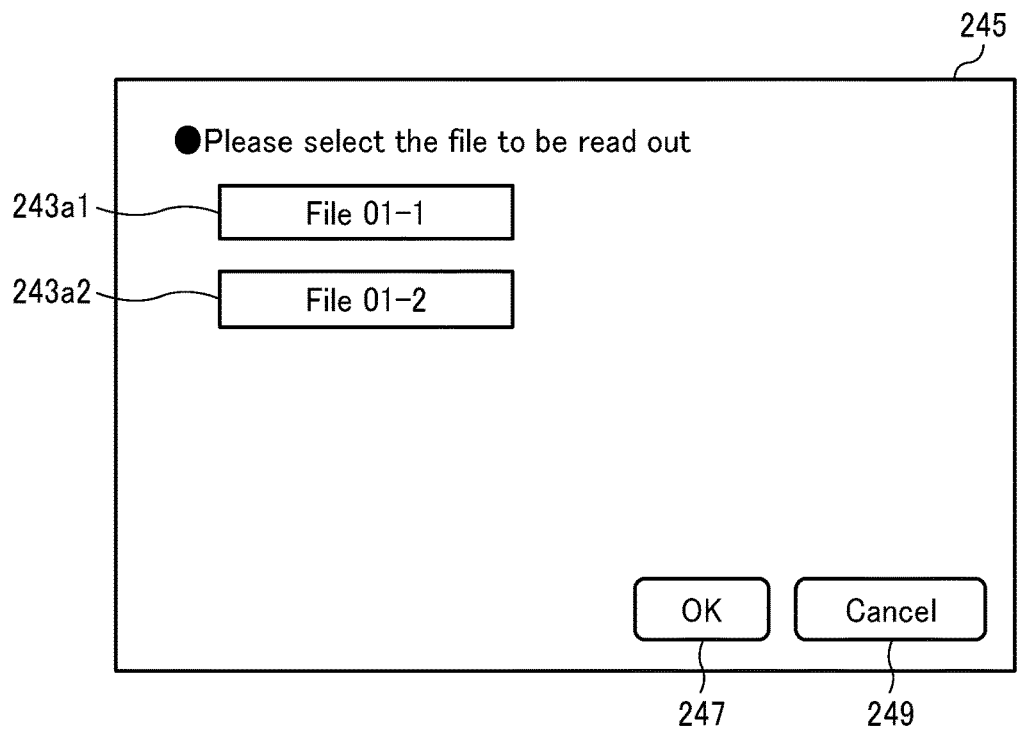
Figure 16C:
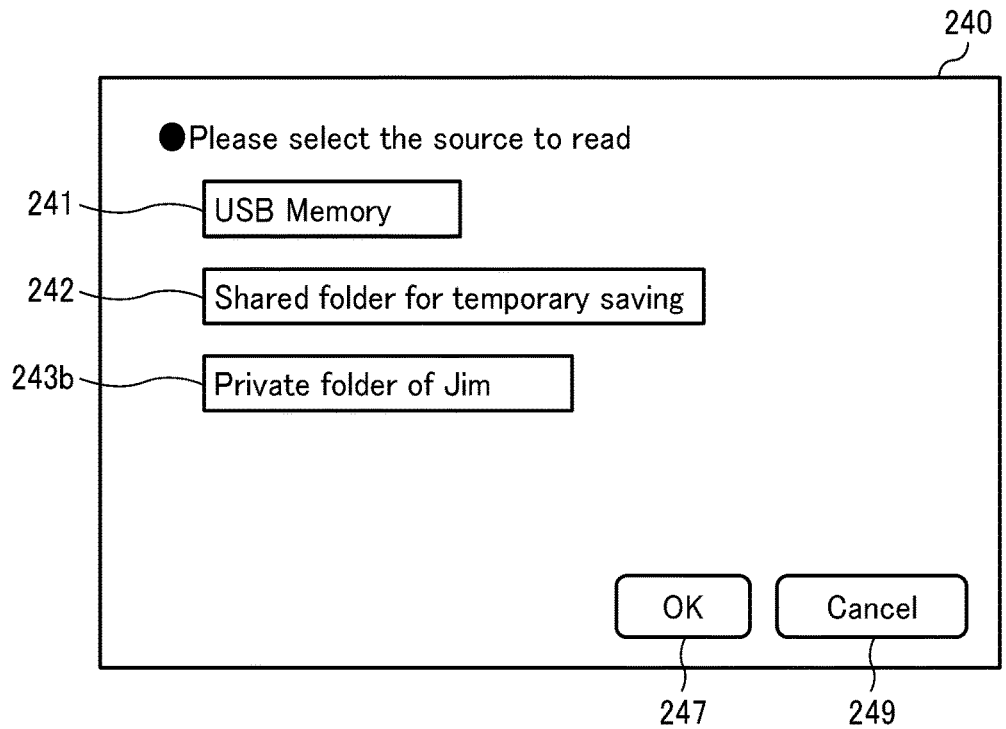

Next, the determination unit 25 determines whether the obtainer and provider 28 has obtained a terminal ID from the privately-owned terminal such as the IC card 3, when the folder selection screen 240 for selecting a folder from which electronic file data is read is being displayed (S33). Hereinafter, a description is given of a case in which a user B (Jim), who is not logged in the electronic whiteboard 2, brings his smartphone 4 close to the near-distance communication device 221 of the electronic whiteboard 2 illustrated in FIG. 15. In this case, when the determination unit 25 determines that the terminal ID is obtained (S33: YES), substantially the same processes as those of S13 to S21 illustrated in FIG. 11 are performed. In this case, at S13, a request for authentication of the smartphone 4 as an example of the privately-owned terminal is transmitted instead of the request for login authentication. When the terminal management server 5 determines that the privately-owned terminal (smartphone 4) is a legitimate terminal (see step S14) and the user name (Jim) of the user B is transmitted from the terminal management server 5, the display control 24 of the electronic whiteboard 2x displays a "Private folder of Jim" button 243b instead of the "Private folder of Mr. Kato" button 243a, as illustrated in FIG. 16C. Further, at S20, the file management server 8 transmits file data of the user B. At S21, the electronic whiteboard 2x stores the file data of the user B in the memory 2000. This makes it easier for the user B to display his/her own file data on the display 220.

Figure 16D:
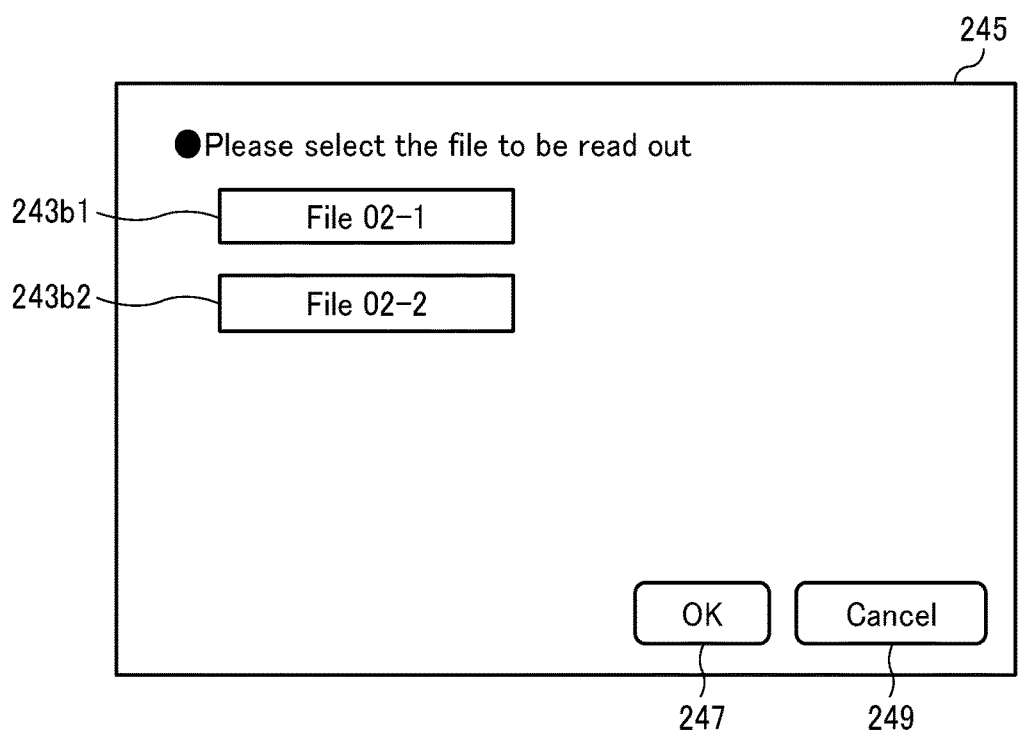

Next, when the user B presses and selects the "Private folder of Jim" button 243b on the folder selection screen 240 illustrated in FIG. 16C, and then presses the "OK" button 247, the acceptance unit 22 accepts the selection of the folder (S35). In response to the acceptance of the selection of the folder, the display control 24 displays a file selection screen 245 for selecting a folder from which electronic file data is read, as illustrated in FIG. 16D (S36). On this file selection screen 245, file names 243b1 and 243b2, each being a file name of electronic file data stored in the private folder of the user B, are displayed. In addition, at the lower part of the file selection screen 245 (see FIGS. 16B and 16D), an "OK" button 247 and a "Cancel" button 249 are displayed. The "OK" button 247 is a graphical image, which, when selected, enables a user to confirm selection of the file name, after any one of the file names 243a1 (243b1) and 243a2 (243b2) is selected. The "Cancel" button 249 is a graphical image, which, when selected, enables the user to cancel the selection of file.

Next, when the user B presses and selects a desired file name on the file selection screen 245 illustrated in FIG. 16D, and then presses the "OK" button 247, the acceptance unit 22 accepts the selection of electronic file to be loaded (S37). The storing and reading processor 29 loads (reads out) file data relating to the electronic file accepted at S37 from the memory 2000 (S38). The display control 24 controls the display 220 to display an image, which is a content of the file data (S39).

By contrast, when the user A presses and selects the "Private folder of Mr. Kato" button 243a illustrated in FIG. 16A and presses the "OK" button 247 in a state in which the folder selection screen 240 as illustrated in FIG. 16A is being displayed on the display 220 under control of the display control 24 at S32, without the smartphone 4 of the user B (Jim), who is not logged in the electronic whiteboard 2, being brought close to the near-distance communication device 221 illustrated in FIG. 15, the operation proceeds to NO at S33. Then, the processes of S35 to S39 are performed. In this case, at S36, the file selection screen 245 as illustrated in FIG. 16B is displayed. On this file selection screen 245, file names 243a1 and 243a2, each being a file name of electronic file data stored in the private folder of the user A, are displayed.

After S39, the operation of loading the electronic file data ends.

<Saving Electronic File Data>

Figure 17A:
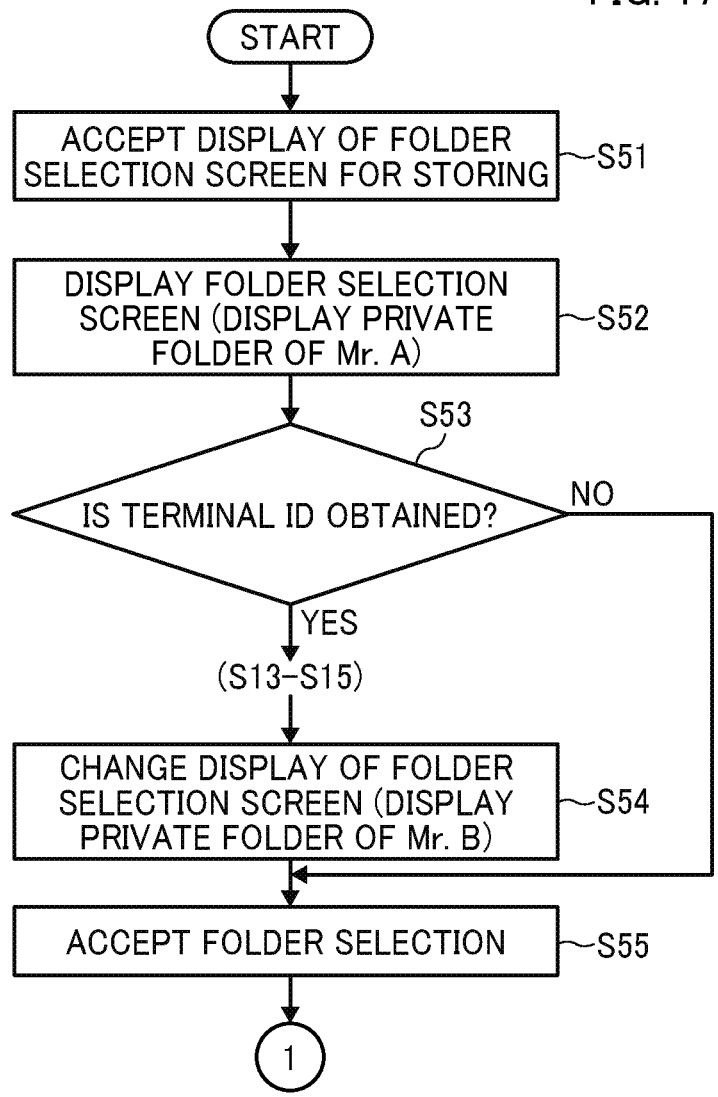
FIGS. 17A and 17B are a flowchart illustrating an operation of saving electronic file data, according to an embodiment of the present disclosure, and FIGS. 18A and 18B each illustrates an example screen displayed by the display at the electronic whiteboard, according to an embodiment of the present disclosure.
Figure 17B:
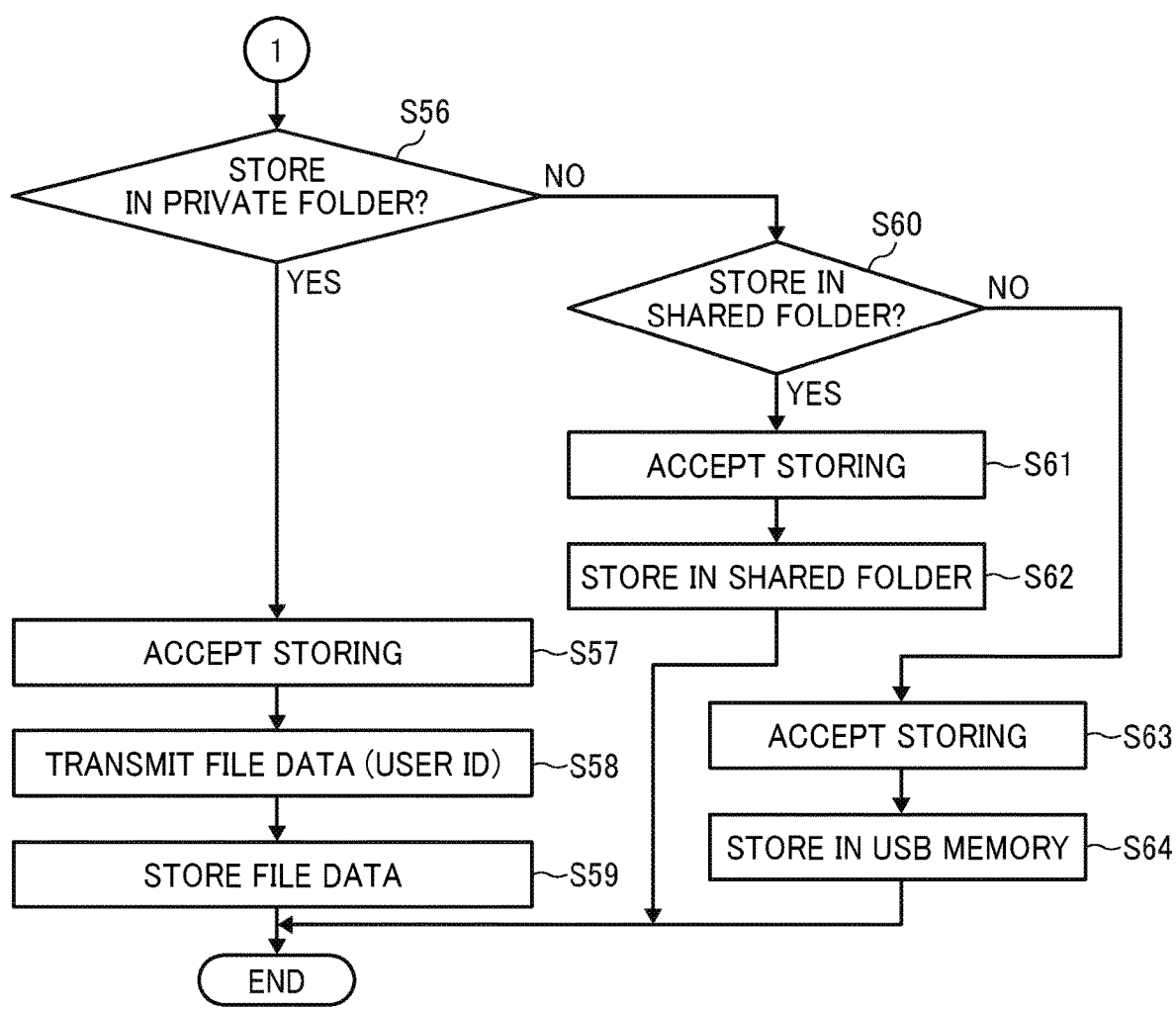
Figure 18A:
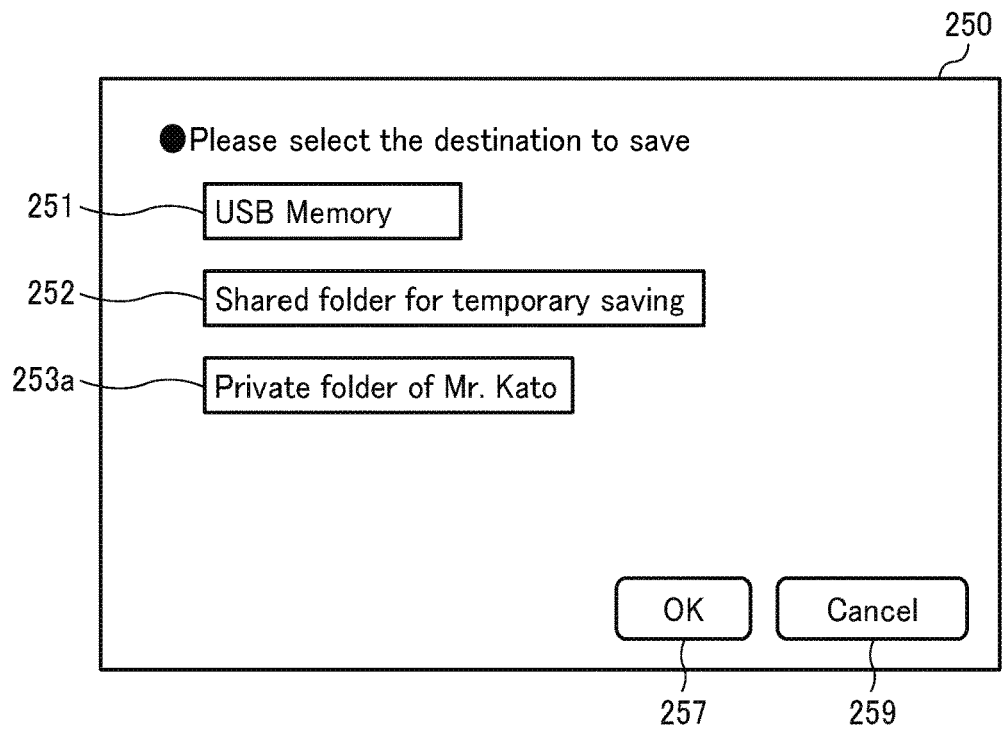
Figure 18B:
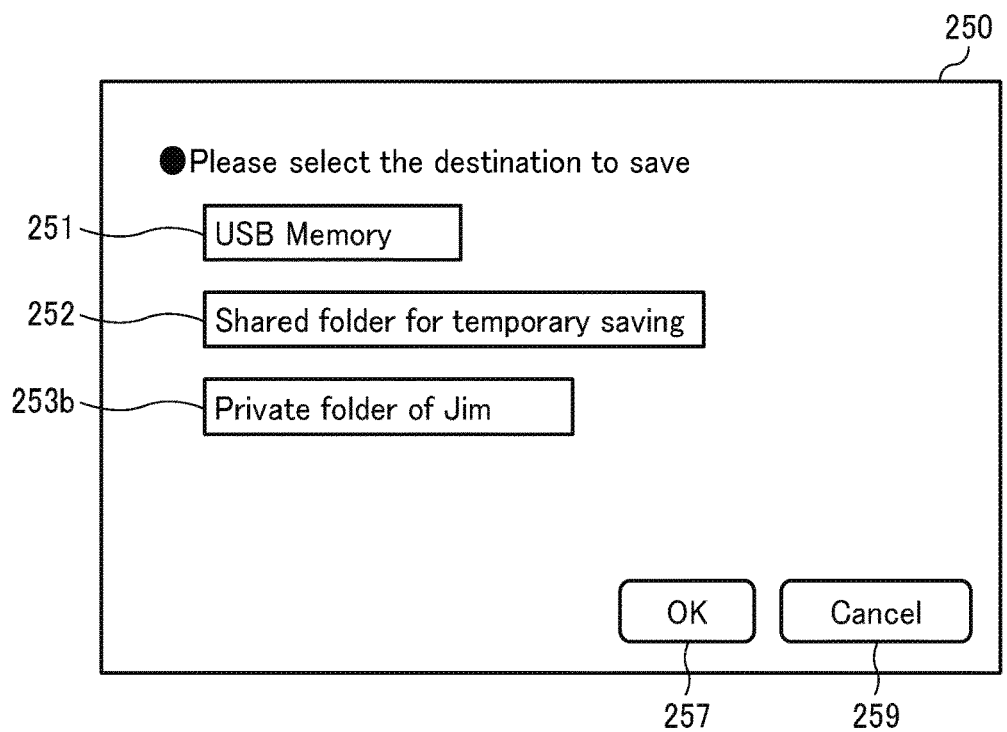

Next, a description is given of an operation of saving electronic file data, with reference to FIGS. 17A and 17B and FIGS. 18A and 18B. FIGS. 17A and 17B are a flowchart illustrating an operation of saving electronic file data. FIGS. 18A and 18B each illustrates an example screen displayed on the display 220 of the electronic whiteboard 2.

When the user A (Kato) who has logged in the electronic whiteboard 2 presses (touches) the "Save" button 235 illustrated in FIG. 8B, the acceptance unit 22 accepts the display of a folder selection screen 250 for selecting a folder to which electronic file data is to be saved (S51). Examples of the electronic file data to be stored include, but not limited to, data of a drawing image drawn on the display 220 of the electronic whiteboard 2 by any user, an image displayed on the display of the electronic whiteboard 2, an image having its information (such as its file name) displayed on the display of the electronic whiteboard 2, and an image that can be selected by the electronic whiteboard 2 for transmission or reception.

The display control 24 controls the display 220 to display the folder selection screen 250 as illustrated in FIG. 18A (S52). This folder selection screen 250 includes a "USB memory" button 251, a "Shared folder for temporary saving" button 252, and a "Private folder of Mr. Kato" button 253a.

The "USB memory" button 251 is a graphical image, which, when selected, causes the electronic whiteboard 2 to store (write) file data in the USB memory 2600 illustrated in FIG. 2. The "Shared folder for temporary saving" button 252 is a graphical image, which, when selected, causes the electronic whiteboard 2 to perform the same or substantially the same process as the process of storing file data in a shared folder of the memory 2000 in response to selection of the "Temporarily save in shared folder and exit" button 238a illustrated in FIG. 8C. The "Private folder of Mr. Kato" button 253a is a graphical image, which, when selected, causes the electronic whiteboard 2 to transmit file data to a private folder of the user A (Mr. Kato) stored in the memory 8000 of the file management server 8 and to store the file data in that private folder. The display control 24 displays "Kato" in the button 253a by using the user name transmitted from the terminal management server 5 at S15 (see FIG. 11).

Thus, when the folder selection screen 250 for selecting a folder to which electronic file data is to be saved is displayed, the button 253a including the name of the user A who has logged in the electronic whiteboard 2 is displayed by default. In addition, at the lower part of the folder selection screen 250 (see FIGS. 18A and 18B), an "OK" button 257 and a "Cancel" button 259 are displayed. The "OK" button 257 is a graphical image, which, when selected, enables a user to confirm selection of the button, after any one of the buttons 251, 252, 253a (253b) is selected. The "Cancel" button 259 is a graphical image, which, when selected, enables the user to cancel the selection of button.

Next, the determination unit 25 determines whether the obtainer and provider 28 has obtained a terminal ID from the privately-owned terminal such as the IC card 3, when the folder selection screen 250 for selecting a folder to which electronic file data is to be saved is being displayed (S53). Hereinafter, a description is given of a case in which a user B (Jim), who is not logged in the electronic whiteboard 2, brings his smartphone 4 close to the near-distance communication device 221 of the electronic whiteboard 2 illustrated in FIG. 15. In this case, when the determination unit 25 determines that the terminal ID is obtained (S53: YES), substantially the same processes as those of S13 to S15 illustrated in FIG. 11 are performed. In this case, at S13, a request for authentication of the smartphone 4 as an example of the privately-owned terminal is transmitted instead of the request for login authentication. When the terminal management server 5 determines that the privately-owned terminal (smartphone 4) is a legitimate terminal (see step S14), and the user name of the user B (Jim) is transmitted from the terminal management server 5, the display control 24 of the electronic whiteboard 2x displays a "Private folder of Jim" button 253b instead of the "Private folder of Mr. Kato" button 253a, as illustrated in FIG. 18B. This makes it easier for the user B to store file data in his/her private folder.

Next, when on the folder selection screen 250 illustrated in FIG. 16B, the user B selects one of the three buttons 251, 252, and 253b in which the user B wants to store file data, and presses the "OK" button 257, the acceptance unit 22 accepts the selection of the folder (S55).

Next, the determination unit 25 determines whether "Private folder of Jim" button 253b has been pressed (S56). In other words, at S56, the determination unit 25 determines whether saving to the private folder has been selected. When the determination unit 25 determines that saving to the private folder is selected (S56: YES), the acceptance unit 22 further accepts file data to be stored (S57).

Next, the transmitter and receiver 21 transmits the file data to be stored to the file management server 8 (S58). In this case, the transmitter and receiver 21 also transmits the user ID of the user B (Jim). Thus, the file management server 8 receives the file data and the user ID of the user B. Next, at the file management server 8, the storing and reading processor 89 stores the file data to be stored, in a folder having a folder name associated with the user ID of the user B in the folder management table (see FIG. 10A) (S59).

By contrast, when the determination unit 25 determines that saving to the private folder is not selected (S56: NO), the determination unit 25 further determines whether the "Shared folder for temporary saving" button 252 is pressed (S60). In other words, at S60, the determination unit 25 determines whether saving to the shared folder for temporary saving is selected. When the determination unit 25 determines that the saving to the shared folder for temporary saving is selected (S60: YES), the acceptance unit 22 accepts file data to be stored (S61). Next, the storing and reading processor 29 stores the file data to be stored, in the shared folder stored in the memory 2000 (S62).

By contrast, when the determination unit 25 determines that the "USB memory" button 251 is pressed, that is, the saving to the shared folder for temporary saving is not selected (S60: NO), the acceptance unit 22 accepts file data to be stored (S63). Next, the storing and reading processor 29 stores the file data to be stored, in a predetermined folder stored in the storage medium 2100 (S64).

Since the electronic whiteboard 2x generates a file name when saving the file, the user does not have to enter a file name. For example, the electronic whiteboard 2x obtains the date and time from a built-in electronic timer, and generates a file name "iwb-yyyymmdd-HHMMSS.pdf" based on the obtained date and time. These yyyy, mm, dd, HH, MM, and SS indicate the year, month, day, hour, minute, and second of the obtained date and time, respectively. At S58, this file name is also transmitted together with the file data.

With the processes as described above, the operation for storing electronic file data ends.

As described heretofore, according to the present embodiment, the electronic file data in the user A's private folder is automatically acquired from the file management server 8 (S17 to S20), in response to the login processes (S11 to S16) of the user A. This enables to save time and efforts required for acquiring desired electronic file data from the file management server 8, and thereby preventing the time period for conference, lesson, etc. from decreasing.

For instance, in one scenario, the shared terminal, such as the electronic whiteboard 2, is used by a plurality of users who attends the meeting. At the end of meeting, more than one user may want to send electronic file data to the file management server. If it takes time for each user to transmit desired electronic file data to the file management server, a time period for conferences, lessons, etc. for subsequent users, who are waiting to use the electronic whiteboard 2 next, may decrease.

Further, some users may not feel comfortable with using the electronic whiteboard 2. Since a private folder of the user is displayed with relatively the simple process as described above, user operability increases.

Further, the button 253a for the user A's private folder stored in the file management server 8 is automatically displayed, in response to the login processes (S11 to S15) of the user A. This enables to save time and efforts required for storing desired electronic file data in the file management server 8. This prevents the time period for conference, lesson, etc. from decreasing as described above, while improving user operability.

Further, the button 253a for the user A's private folder is displayed with the user name of the user A, which is obtained using the terminal identification information of the terminal of the user A. With the user name being displayed, the user can instantly recognize that the user's private folder is accessible. In this example, any characters, figures, or signs may be displayed with the button 253a, as the user name. For example, the user name may be a part of the user name such as the user's initial. In another example, a picture, or any image, that is registered as the user name may be displayed with the button 253a.

The above-described file data includes stroke data. This stroke data is data, which is converted from drawing data, drawn on the display 220 by a user with the electronic pen 2500 or the hand H. The stroke data indicates a start time indicating a time when drawing of one stroke starts, an end time indicating a time when drawing of one stroke ends, a color of the stroke, a width of the stroke, and a coordinate arrangement identifying an arrangement of points of the stroke. Different from the image data, the stroke data that is once stored can be edited after being read out.

In the above embodiment, on the screens illustrated in FIGS. 16C and 18B, the "Private folder of Jim" button 243b and the "Private folder of Jim" button 253b are displayed instead of the "Private folder of Mr. Kato" button 243a and the "Private folder of Mr. Kato" button 253a. In another example, the "Private folder of Jim" button 243b and the "Private folder of Jim" button 253b may be displayed in addition to the "Private folder of Mr. Kato" button 243a and the "Private folder of Mr. Kato" button 253a. In this case, when the "Cancel" button 249 or 259 is pressed, the screen may transition to the previous screen as illustrated in FIG. 16A or FIG. 18A.

According to an aspect of the present disclosure, it is possible to save time and efforts required for transmitting desired electronic file data to the file management server, and thereby preventing the time period for conference, lesson, etc. from decreasing.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Although in the above embodiment, with reference to FIG. 17, description is given of the process of storing electronic file data in a case in which a shared terminal is the electronic whiteboard 2x, the shared terminal may be any suitable device other than the electronic whiteboard 2x. For example, the shared terminal may be a whiteboard provided with a movable scanner that scans a drawing drawn, for example, with a marker pen. In this case, the file data of the drawing image scanned by the movable scanner may be stored in any desired memory such as the USB memory 2600, or a storage area of any server such as in a shared folder or a private folder.

For example, while the above-described example illustrates the example case in which the electronic whiteboard 2 is used as a shared terminal, various other devices may be used as the shared terminal. For example, any one of the above-described embodiments is also applicable to a projector that projects an image based on image data, and a videoconference terminal for transmitting and receiving image data and voice data to and from a plurality of terminals.

In one example, the projector may be input with drawings made by a user on a screen projected by the projector, using an electronic pen or a user's finger, for example. Further, the user is able to write on an image that is projected with the projector, such as an image of presentation material.

Similarly, in one example, the videoconference terminal may be input with drawings made by a user on a screen, which may be displayed or projected. For example, any writing made by the user, for example, on the electronic whiteboard or any material (such as paper or wall) may be captured using a camera of the videoconference terminal. Further, the videoconference terminal is able to capture, using a microphone, voices of participants.

Any one of the above-described operations may be performed in various other ways, for example, in an order different from the one described above.

As can be appreciated by those skilled in the computer arts, this disclosure may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present disclosure may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:
1. A shared terminal, comprising:
circuitry configured to:
control a display to display an image to a plurality of users, the plurality of users simultaneously sharing a use of the shared terminal, obtain, from a first terminal of a first user, first terminal identification information for identifying the first terminal;
transmit an authentication request to allow the first user initial access to the shared terminal and transmit the first terminal identification information to a terminal management server, the terminal management server storing, for each of the plurality of users, a user name of a user in association with terminal identification information identifying a terminal of the user;
receive a first user name of the first user, the first user name being transmitted from the terminal management server based on a successful authentication result for the authentication request, the successful authentication result being obtained based on a determination that the first terminal identification information is stored in the terminal management server;
allow the first user functional access to the shared terminal upon successful authentication of the first user;
receive electronic data of a private folder of the first user upon successful authentication of the first user;
store in the shared terminal, without displaying, the received electronic data until the private folder is requested to be readout by the first user for display; and
upon successful authentication of the first user and upon request by the first user, control the display to display a graphical representation that reflects the private folder of the first user as one of selectable destinations in which electronic file data is to be stored.

2. The shared terminal of claim 1, wherein
based on the successful authentication result for the authentication request, the circuitry is further configured to receive first user identification information for identifying the first user from the terminal management server, the terminal management server further storing user identification information of the user in association with the user name of the user and the terminal identification information of the user, and
in response to reception of a selection of the private folder of the first user as a destination in which the electronic file data is to be stored, the circuitry is configured to transmit the first user identification information that is associated with the first user name corresponding to the private folder that is selected and the electronic file data, to a file management server, the file management server storing, for each of the plurality of users, the user identification information in association with a folder name of a private folder of the user in which electronic file data is to be stored.

3. The shared terminal of claim 2, wherein
in response to obtaining second terminal identification information for identifying a second terminal of a second user from the second terminal when the graphical representation that reflects the private folder of the first user is being displayed on the display as one of the selectable destinations in which the electronic file data is to be stored, the circuitry is further configured to transmit a request for authentication of the second terminal and the second terminal identification information, to the terminal management server,
the circuitry is further configured to receive a second user name of the second user, the second user name being transmitted from the terminal management server based on a successful authentication result for the request for authentication of the second terminal, the successful authentication result being obtained when the terminal management server determines that the second terminal identification information is stored in the terminal management server, and
control the display to display a graphical representation that reflects a private folder of the second user as being selectable.

4. The shared terminal of claim 3, wherein
based on the successful authentication result for the request for authentication of the second terminal, the circuitry is further configured to receive second user identification information for identifying the second user from the terminal management server,
in response to a selection of the private folder of the second user as a destination in which the electronic data is to be stored, the circuitry is configured to transmit the second user identification information that is associated with the second user name corresponding to the private folder of that is selected and the electronic file data, to the file management server, the file management server storing, for each of the plurality of users, the user identification information in association with a folder name of a private folder of the user in which electronic file data is to be stored.

5. The shared terminal of claim 3,
wherein the circuitry controls the display to display the graphical representation of the private folder of the second user together with the graphical representation of the private folder of the first user.

6. The shared terminal of claim 3,
wherein the circuitry controls the display to display the graphical representation of the private folder of the second user instead of the graphical representation of the private folder of the first user.

7. The shared terminal of claim 1,
wherein the private folder is received from a file management server and the graphical representation of the private folder of the first user includes at least a part of the first user name.

8. The shared terminal of claim 7,
wherein the circuitry controls the display to display a graphical representation that reflects a shared folder of the plurality of users as one of the selectable destinations in which electronic file data is to be stored.

9. The shared terminal of claim 1, wherein the authentication request requests the terminal management server to allow login by the user.

10. The shared terminal of claim 1, wherein the shared terminal is an electronic whiteboard.

11. A display control method performed by a shared terminal, the method comprising:
displaying an image to a plurality of users, the plurality of users simultaneously sharing a use of the shared terminal;
obtaining, from a first terminal of a first user, first terminal identification information for identifying the first terminal;
transmitting an authentication request and the first terminal identification information to a terminal management server, the terminal management server storing, for each of the plurality of users, a user name of a user in association with terminal identification information identifying a terminal of the user;
receiving a first user name of the first user, the first user name being transmitted from the terminal management server based on a successful authentication result for the authentication request, the successful authentication result being obtained based on a determination that the first terminal identification information is stored in the terminal management server;

allowing the first user functional access to the shared terminal upon successful authentication of the first user;

receiving electronic data of a private folder of the first user upon successful authentication of the first user;

storing in the shared terminal, without displaying, the received electronic data until the private folder is requested by the first user; and upon successful authentication of the first user and upon request by the first user, displaying a graphical representation that reflects the private folder of the first user as one of selectable destinations in which electronic file data is to be stored.

12. The display control method of claim 11, further comprising:

obtaining second terminal identification information for identifying a second terminal of a second user from the second terminal, as one of the selectable destinations in which the electronic file data is to be stored, while the graphical representation that reflects the private folder of the first user is being displayed;

transmitting a request for authentication of the second terminal and the second terminal identification information, to the terminal management server;

receiving a second user name of the second user, the second user name being transmitted from the terminal management server based on a successful authentication result for the request for authentication of the second terminal, the successful authentication result being obtained when the terminal management server determines that the second terminal identification information is stored in the terminal management server; and displaying a graphical representation that reflects a private folder of the second user as being selectable.

13. The display control method of claim 12, further comprising:

switching the display of the graphical representation, from the graphical representation of the private folder of the first user to the graphical representation of the private folder of the second user.

14. A non-transitory computer-readable medium storing a plurality of instructions which, when executed by one or more processors, cause the processors to perform a display control method performed by a shared terminal, the method comprising:

displaying an image to a plurality of users, the plurality of users simultaneously sharing a use of the shared terminal;

obtaining, from a first terminal of a first user, first terminal identification information for identifying the first terminal;

transmitting an authentication request and the first terminal identification information to a terminal management server, the terminal management server storing, for each of the plurality of users, a user name of a user in association with terminal identification information identifying a terminal of the user;

receiving a first user name of the first user, the first user name being transmitted from the terminal management server based on a successful authentication result for the authentication request, the successful authentication result being obtained based on a determination that the first terminal identification information is stored in the terminal management server;

allowing the first user functional access to the shared terminal upon successful authentication of the first user;

receiving electronic data of a private folder of the first user upon successful authentication of the first user;

storing in the shared terminal, without displaying, the received electronic data until the private folder is requested by the first user; and upon successful authentication of the first user and upon request by the first user, displaying a graphical representation that reflects a private folder of the first user as one of selectable destinations in which electronic file data is to be stored.

* * * * *